United States Patent
Tang et al.

(10) Patent No.: US 12,113,736 B2
(45) Date of Patent: Oct. 8, 2024

(54) ELECTRONIC DEVICES AND METHODS FOR SOUNDING REFERENCE SIGNAL (SRS) TRANSMISSION SWITCHING

(71) Applicant: MEDIATEK SINGAPORE PTE. LTD., Singapore (SG)

(72) Inventors: Zhixun Tang, Beijing (CN); Tsang-Wei Yu, Hsinchu (TW)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 398 days.

(21) Appl. No.: 17/430,458

(22) PCT Filed: Feb. 14, 2020

(86) PCT No.: PCT/CN2020/075270
§ 371 (c)(1),
(2) Date: Aug. 12, 2021

(87) PCT Pub. No.: WO2020/164589
PCT Pub. Date: Aug. 20, 2020

(65) Prior Publication Data
US 2022/0116172 A1    Apr. 14, 2022

(30) Foreign Application Priority Data

Feb. 14, 2019  (WO) ................ PCT/CN2019/075034
Feb. 15, 2019  (WO) ................ PCT/CN2019/075174

(51) Int. Cl.
*H04L 5/00* (2006.01)
*H04W 74/0808* (2024.01)

(52) U.S. Cl.
CPC .......... *H04L 5/0048* (2013.01); *H04L 5/0098* (2013.01); *H04W 74/0825* (2013.01)

(58) Field of Classification Search
CPC ... H04L 5/0048; H04L 5/0098; H04L 5/0057; H04L 5/1469; H04L 5/0007; H04L 5/001;
(Continued)

(56) References Cited

U.S. PATENT DOCUMENTS

2017/0302419 A1* 10/2017 Liu ...................... H04L 5/0078
2017/0324528 A1* 11/2017 Rico Alvarino ...... H04W 56/00
(Continued)

FOREIGN PATENT DOCUMENTS

CN    109075938 A    12/2018
CN    109076464 A    12/2018
(Continued)

OTHER PUBLICATIONS

Combined Chinese Office Action and Search Report issued Jun. 17, 2023 in Patent Application No. 202080001242.6 (with English translation of Category of Cited Documents), 10 pages.
(Continued)

*Primary Examiner* — Ricky Q Ngo
*Assistant Examiner* — David M Kayal
(74) *Attorney, Agent, or Firm* — Helen Mao; Imperium Patent Works

(57) ABSTRACT

Aspects of the disclosure provide an electronic device including processing circuitry and a method. The processing circuitry can determine whether a collision is scheduled in one of a set of carriers at a same time with an SRS transmission switching process including an SRS transmission scheduled in a current carrier in the set of carriers. The set of carriers is activated for the electronic device. When no collision is determined to be scheduled in the set of carriers at the same time with the SRS transmission switching process, the processing circuitry can determine a SRS interruption duration for a victim carrier to be interrupted by the SRS transmission switching process based on a SRS trans-
(Continued)

mission switching duration, a timing between the SRS transmission switching process and the victim carrier, a numerology of the current carrier, and a numerology of the victim carrier and transmit the SRS transmission.

20 Claims, 17 Drawing Sheets

(58) Field of Classification Search
CPC ....... H04L 5/0053; H04L 5/00; H04L 5/0044; H04L 5/14; H04W 74/0825; H04W 74/00; H04W 74/08; H04W 56/00
See application file for complete search history.

(56) References Cited

U.S. PATENT DOCUMENTS

| | | | |
|---|---|---|---|
| 2019/0044678 A1 | 2/2019 | Liu et al. | |
| 2019/0229859 A1* | 7/2019 | Manolakos | H04W 56/00 |
| 2020/0229202 A1* | 7/2020 | Bagheri | H04L 25/0226 |
| 2021/0144716 A1* | 5/2021 | Choi | H04W 72/53 |
| 2021/0392609 A1* | 12/2021 | Siomina | H04W 64/00 |
| 2022/0329369 A1* | 10/2022 | Papasakellariou | H04W 52/242 |
| 2022/0369238 A1* | 11/2022 | Rahman | H04W 52/54 |

FOREIGN PATENT DOCUMENTS

| | | | |
|---|---|---|---|
| WO | WO 2017/173388 A1 | 10/2017 | |
| WO | WO 2017/192232 A1 | 11/2017 | |
| WO | WO-2018083631 A1 * | 5/2018 | H04L 5/001 |

OTHER PUBLICATIONS

International Search Report and Written Opinion issued on May 11, 2020 in PCT/CN2020/075270 filed on Feb. 14, 2020.
"Interruption at SRS Carrier Switching," Media Tek Inc., 3GPP TSG-RAN WG4 Meeting #90, R4-1900683, 2019, 6 total pages.
"Discussion on issues for SRS Carrier Switching," Qualcomm Incorporated, 3GPP TSG RAN WG1 Meeting #90, R1-1712771, 2017, pp. 1-3.
"Clarification on SRS switching among CCs," Huawei, HiSilicon, 3GPP TSG RAN WG1 NR Ad Hoc Meeting #4, R1-1800525, 2018, 6 total pages.
Extended European Search Report issued on Jul. 15, 2022 in European Patent Application No. 20754894.2, 10 pages.
Ericsson, "Correction in SRS switching requirements", 3GPP TSG-RN WG4 Meeting #86bis Draft, 36133_CR5699R1, vol. RAN WG4, No. Melbourne, Australia; Apr. 16, 2018-Apr. 20, 2018, 2018, XP051511287, pp. 1-3, Retrieved from the Internet: URL:http://www.3gpp.org/ftp/tsg%5Fran/TSG%5FRAN/TSGR%5F80/Docs/RP%2D181115%2Ezip.
Huawei et al., "Remaining details on SRS switching among CCs", 3GPP TSG RAN WG1 Meeting 91 Draft; R1-1719446, vol. RAN WG1, No. Reno, USA; Nov. 27, 2017-Dec. 1, 2017, 2017, XP051369147, Retrieved from the Internet: URL:http://www.3gpp.org/ftp/tsg%5Fran/WG1%5FRL1/TSGR1%5F91/Docs.
Indian Office Action issued Jan. 18, 2023 in Indian Patent Application No. 202127039987, 6 pages.

* cited by examiner

ELECTRONIC DEVICES AND METHODS FOR SOUNDING REFERENCE SIGNAL (SRS) TRANSMISSION SWITCHING

CROSS REFERENCE TO RELATED APPLICATIONS

This present application claims the benefit of priority to International Application No. PCT/CN2019/075034, filed on Feb. 14, 2019, and International Application No. PCT/CN2019/075174, filed on Feb. 15, 2019, which are incorporated by reference herein in their entireties.

TECHNICAL FIELD

The present application relates generally to wireless communication technology including sounding reference signal (SRS) transmission.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SRS can be transmitted from an electronic device to a network. Subsequently, the network can obtain channel quality information based on the SRS. The SRS can include one or more symbols. In an example, a last symbol in the SRS is aligned with a last symbol in a slot.

SUMMARY

Aspects of the disclosure provide an electronic device that includes processing circuitry for a sounding reference signal (SRS) transmission switching process. The processing circuitry can determine whether a collision is scheduled in one of a set of carriers at a same time with an SRS transmission switching process. The collision can be a downlink reception or an uplink transmission. An SRS transmission can be scheduled in a current carrier in the set of carriers in the SRS transmission switching process. The set of carriers can be activated for the electronic device. The collision can have a higher priority to be transmitted than the SRS transmission. When no collision is determined to be scheduled in the set of carriers at the same time with the SRS transmission switching process, the processing circuitry can determine a SRS interruption duration for a victim carrier that is to be interrupted by the SRS transmission switching process based on a SRS transmission switching duration, a timing between the SRS transmission switching process and the victim carrier, a numerology of the current carrier, and a numerology of the victim carrier. The victim carrier can be in the set of carriers and different from the current carrier, the numerology of the victim carrier can include a subcarrier spacing (SCS) of the victim carrier. The processing circuitry can transmit the scheduled SRS transmission in the current carrier.

In an embodiment, when the collision is determined to be scheduled in the one of the set of carriers at the same time with the SRS transmission switching process, the processing circuitry can discard a portion of the SRS transmission from being transmitted in the current carrier. The portion of the SRS transmission can be scheduled at the same time with the collision.

In an embodiment, the collision in the one of the set of carriers includes a synchronization signal block (SSB) from a network to the electronic device.

In an embodiment, when no collision is determined to be scheduled in the set of carriers at the same time with the SRS transmission switching process, the SRS transmission switching duration is based on the SRS transmission duration and a SRS switching duration. The SRS transmission duration is based on the numerology of the current carrier that includes a SCS of the current carrier. The SRS interruption duration for the victim carrier is a number of slots in the victim carrier to be interrupted by the SRS transmission switching process. The processing circuitry can transmit no downlink (DL) and/or uplink (UL) data in the number of slots in the victim carrier.

In an embodiment, prior to transmitting the scheduled SRS transmission, the processing circuitry can switch from a first antenna port to a second antenna port in the current carrier in a first antenna switching duration. After transmitting the scheduled SRS transmission, the processing circuitry can switch from the second antenna port to the first antenna port in a second antenna switching duration. The processing circuitry can transmit the scheduled SRS transmission in the current carrier using the second antenna port. The SRS switching duration includes the first antenna switching duration and the second antenna switching duration. The SRS transmission switching duration on the current carrier is a sum of the SRS transmission duration and the SRS switching duration.

In an embodiment, prior to transmitting the scheduled SRS transmission, the processing circuitry can switch from a previous carrier to the current carrier in a first carrier switching duration. After transmitting the scheduled SRS transmission, the processing circuitry can switch from the current carrier to the previous carrier in a second carrier switching duration. The SRS switching duration includes the first carrier switching duration and the second carrier switching duration. The SRS transmission switching duration on the current carrier is a sum of the SRS transmission duration and the SRS switching duration.

In an embodiment, the SRS transmission switching process includes a first SRS sub-switching process and a second SRS sub-switching process. The first SRS sub-switching process can have a first switching step from a first carrier to the current carrier and the SRS transmission on the current carrier. The second SRS sub-switching process can have a second switching step from the current carrier to a third carrier, another SRS transmission on the third carrier, and a third switching step from the third carrier to the first carrier. The SRS switching duration is a sum of a first switching duration of the first switching step, a second switching duration of the second switching step, and a third switching duration of the third switching step. The SRS transmission switching duration is a sum of the SRS transmission duration, another SRS transmission duration of the other SRS transmission, and the SRS switching duration. The number of slots in the victim carrier to be interrupted by the SRS transmission switching process is further determined based on an interruption gap between the first SRS sub-switching process and the second SRS sub-switching process.

In an embodiment, the victim carrier is not in a same frequency range (FR) as the current carrier and the electronic device is configured with per-FR gap capability, determination of the number of slots is skipped.

In an embodiment, the victim carrier is in a same frequency range (FR) as the current carrier.

In an embodiment, one or more frequency bands are configured for the electronic device. The processing circuitry can determine whether the one or more frequency bands are affected by the SRS transmission switching process. When at least one of the one or more frequency bands is determined to be affected by the SRS transmission switching process, the processing circuitry can determine whether the collision is scheduled in the one of the set of carriers at the same time with the SRS transmission switching process. The one of the set of carriers is in the at least one of the one or more frequency bands.

Aspects of the disclosure provide a method for a SRS transmission switching process. The method includes determining whether a collision is scheduled in one of a set of carriers at a same time with an SRS transmission switching process. An SRS transmission can be scheduled in a current carrier in the set of carriers in the SRS transmission switching process. The set of carriers can be activated for the electronic device. The collision can have a higher priority to be transmitted than the SRS transmission. When no collision is determined to be scheduled in the set of carriers at the same time with the SRS transmission switching process, the method further includes determining a SRS interruption duration for a victim carrier that is to be interrupted by the SRS transmission switching process based on a SRS transmission switching duration, a timing between the SRS transmission switching process and the victim carrier, a numerology of the current carrier, and a numerology of the victim carrier. The victim carrier can be in the set of carriers and different from the current carrier. The numerology of the victim carrier can include a subcarrier spacing (SCS) of the victim carrier. The method further includes transmitting the scheduled SRS transmission in the current carrier.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION

Figure 1:
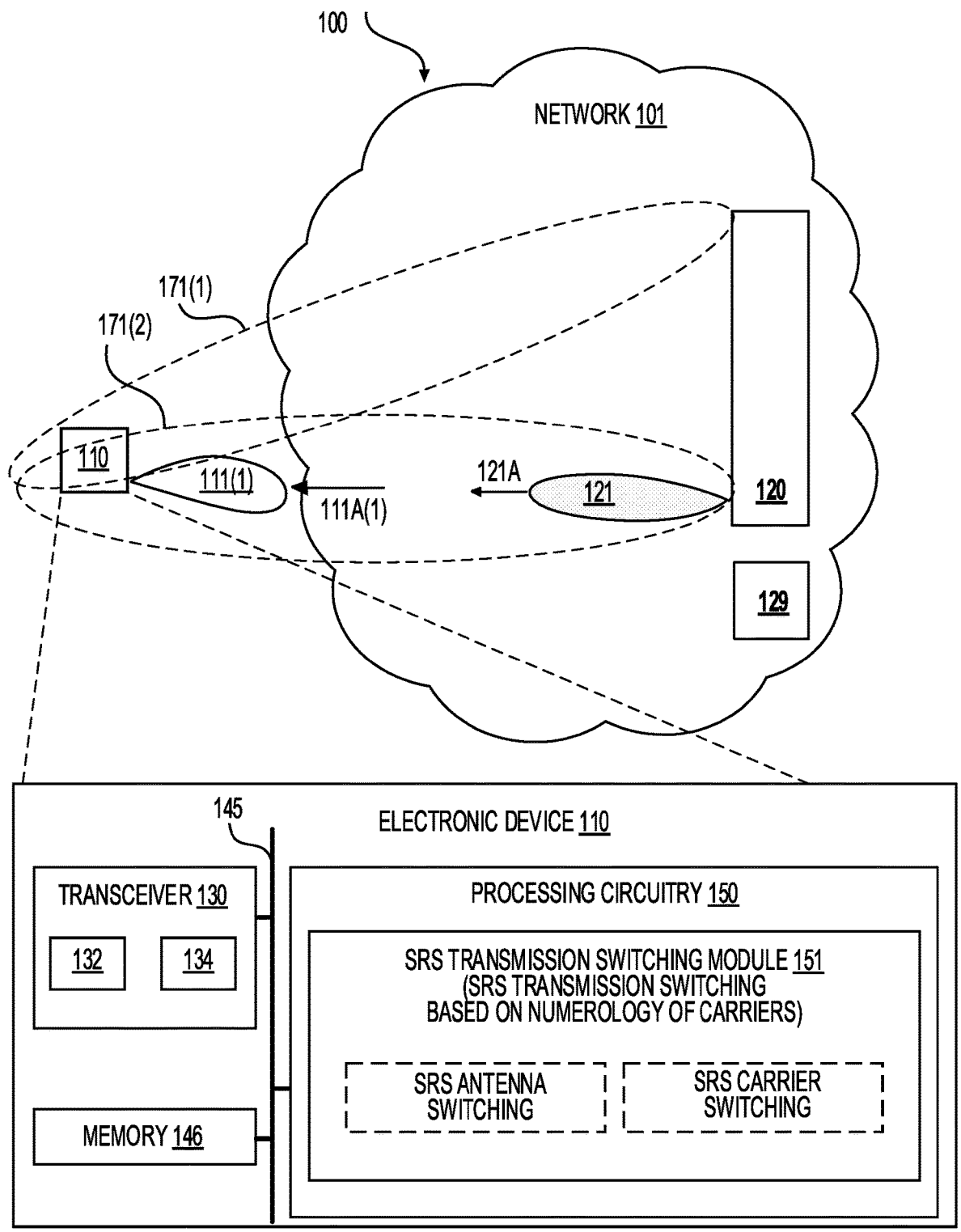
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. A plurality of carriers or cells (e.g., cells 171(1)-171(2)) can be configured by the network 101 (e.g., a base station 120) to serve the electronic device 110 to increase a data rate for the electronic device 110. The electronic device 110 can include antenna ports to transmit and/or receive signals. In an embodiment, the electronic device 110 is configured with more downlink (DL) carriers for DL communication from the network 101 to the electronic device 110 than uplink (UL) carrier(s) for UL communication from the electronic device 110 to the network 101. In an embodiment, the electronic device 110 receives signals with multiple antenna ports and transmits with a subset of the multiple antenna ports. According to aspects of the disclosure, to exploit channel reciprocity, a sounding reference signal (SRS) transmission switching procedure can be implemented. The SRS transmission switching procedure can have an SRS transmission switching process including, for example, switching a SRS transmission from a first carrier to a second carrier, from a first antenna port to a second antenna port, or the like. Subsequently, the SRS transmission can be transmitted on, for example, the second carrier or the second antenna port.

The communication system 100 can be any suitable communication system, such as a fifth generation (5G) system (5GS), a fourth generation (4G) system (4GS), an evolved packet system (EPS), or the like. The network 101 can include various base stations, such as the base station 120 and a base station 129, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and 4G mobile network technologies, 5G mobile network technology, global system for mobile communication (GSM), long-term evolution (LTE) technologies, new radio (NR) technologies, and the like. In some examples, the network 101 employs wireless communication technologies developed by 3rd Generation Partnership Project (3GPP). In an example, the base stations in the network 101 form one or more access networks and the core nodes form one or more core networks. An access network can be a radio access network (RAN), such as a 5G RAN or NG RAN, an Evolved Universal Terrestrial Radio Access (E-UTRA), and the like. A core network can be an evolved packet core (EPC), a 5G core (5GC), and the like. In an example, the network 101 includes a 5G RAN and a 5GC that uses 5G mobile network technology.

In various examples, a base station (e.g., the base station 120, the base station 129) can be referred to as a Node B, an evolved Node B, a next generation Node B (gNB) specified in 5G NR air interface standards developed by 3GPP, and the like. In an example, the base stations 120 and 129 are gNBs. The base stations 120 and 129 include hardware components and software components configured to enable wireless communications between the base stations 120 and 129 and the electronic device 110, respectively. Further, the core nodes include hardware components and software components to form a backbone to manage and control the services provided by the network 101.

Figure 2A:
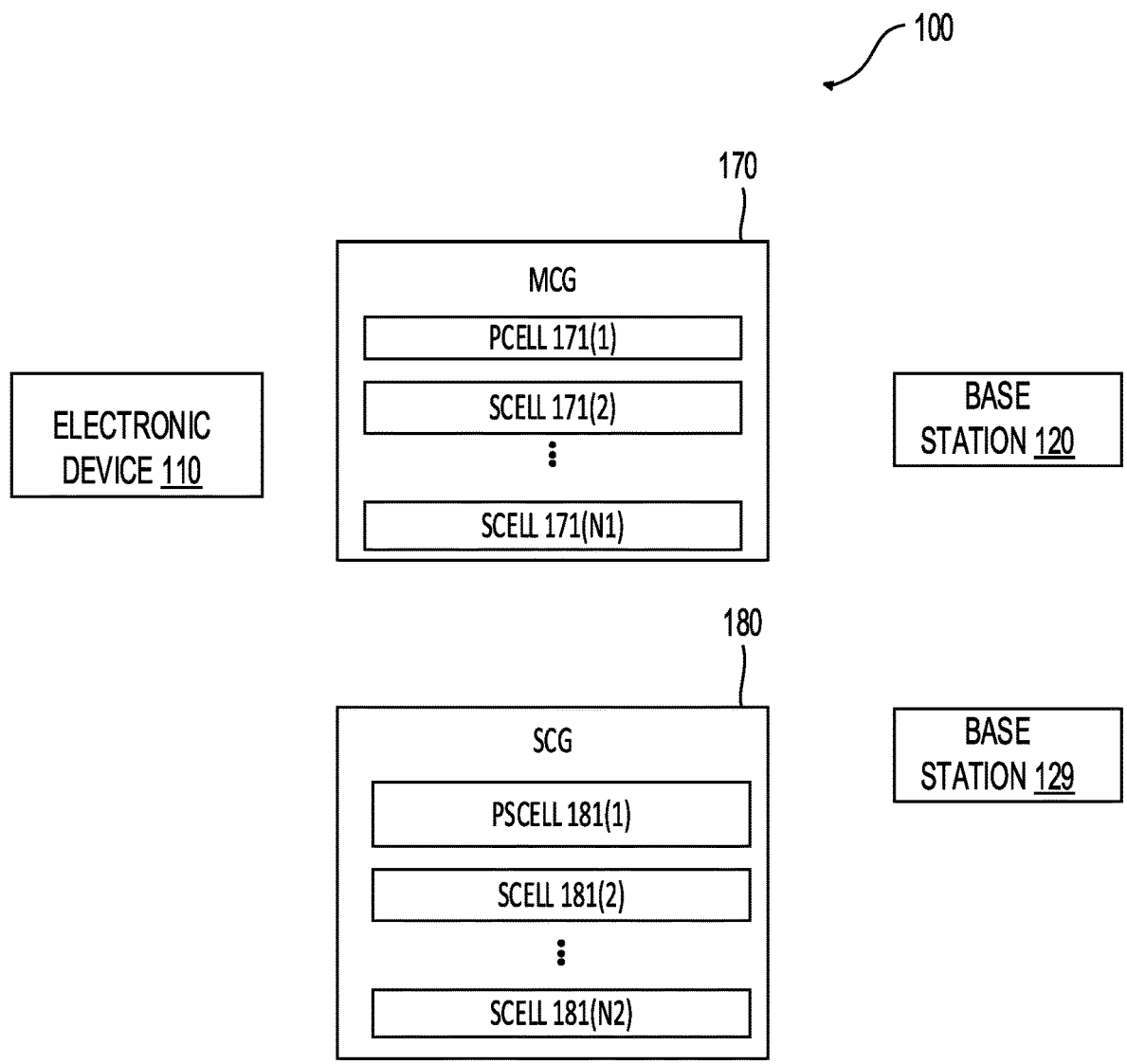
FIG. 2A shows cell groups in a communication system according to an embodiment of the disclosure.

In some embodiments, the electronic device 110 and the network 101 are configured to deploy carrier aggregation (CA) and/or dual connectivity (DC) to enhance a throughput (e.g., a data rate, a bandwidth) of the electronic device 110. FIG. 2A shows cell groups 170 and 180 in the communication system 100 according to an embodiment of the disclosure. CA can be employed by the communication system 100, and the cell group 170 is configured for the electronic device 110 to communicate with the base station 120. Referring to FIG. 2A, the cell group 170 can be a master cell group (MCG) 170 including the primary cell (PCell) 171(1) (or primary component carrier (CC) (PCC)) and secondary cell(s) (SCell(s), or secondary component carrier (SCC)) 171(2)-171(N1) where N1 is an integer larger than 1. Each cell or carrier in the cell group 170 can have a respective frequency (also referred to as carrier frequency, a carrier, a CC). A plurality of the carriers can be aggregated and transmitted in parallel to/from the electronic device 110 in CA, and thus increasing a data rate.

DC can be deployed by the communication system 100, and thus a plurality of cell groups can be configured for the electronic device 110 to communicate with, for example, a plurality of base stations. Referring to FIG. 2A, the MCG 170 can be configured for the electronic device 110 to communicate with the base station 120, and a Secondary Cell Group (SCG) 180 can be configured for the electronic device 110 to communicate with the base station 129. The SCG 180 can include a primary secondary cell (PSCell) 181(1) and SCell(s) 181(2)-181(N2) where N2 is an integer larger than 1.

Different carrier frequencies (or carriers) can be used in the communication system 100, and multiple frequency ranges can be allocated for the electronic device 110. Carrier frequencies less than 6 GHz can be referred to as low frequencies (LF), such as between 600 MHz to less than 6 GHz. For example, a frequency range 1 (FR1) includes frequencies below 6 GHz. High frequencies can be used as carrier frequencies to increase a network capacity (e.g., a data rate, a bandwidth). In an example, the high frequencies are higher than 6 giga-Hertz (GHz), such as between 24-84 GHz. A frequency range 2 (FR2) can include frequencies in the range 24.25-52.6 GHz. HF signals with high frequencies can experience large propagation loss and can be sensitive to blockage. Accordingly, referring to FIG. 1, for the HF signals, a base station (e.g., the base station 120) and the electronic device 110 can perform beamformed transmission and/or reception where signal energy can be focused predominantly toward a specific direction, such as a direction 121A associated with a beam 121 transmitted from the base station 120 or a direction 111A(1) associated with a beam 111(1) received by the electronic device 110. Therefore, omnidirectional beams can be used to transmit LF signals in FR1 and directional beams (e.g., 121 and 111(1)) can be used to transmit HF signals in FR2. In general, beam management, e.g., a set of procedures to acquire and maintain a set of transmission (Tx) (e.g., the beam 121) and reception (Rx) (e.g., the beam 111(1)) beams or beam pairs (e.g., a beam pair formed by 121 and 111(1)) can be implemented to form and maintain a suitable link between the network 101 (e.g., the base station 120) and the electronic device 110 for UL communication or transmission from the electronic device 110 to the network 101 and DL communication or transmission from the network 101 to the electronic device 110.

Referring to FIG. 1, the base station 120 can transmit a plurality of Tx beams including the beam 121 to cover the cell 171(2). In an example, a plurality of electronic devices is served by the base station 120. In an example, the electronic device 110 is served by the cells 171(1)-171(2). The cells 171(1)-171(2) can partially overlap, as shown in FIG. 1.

Figure 2B:
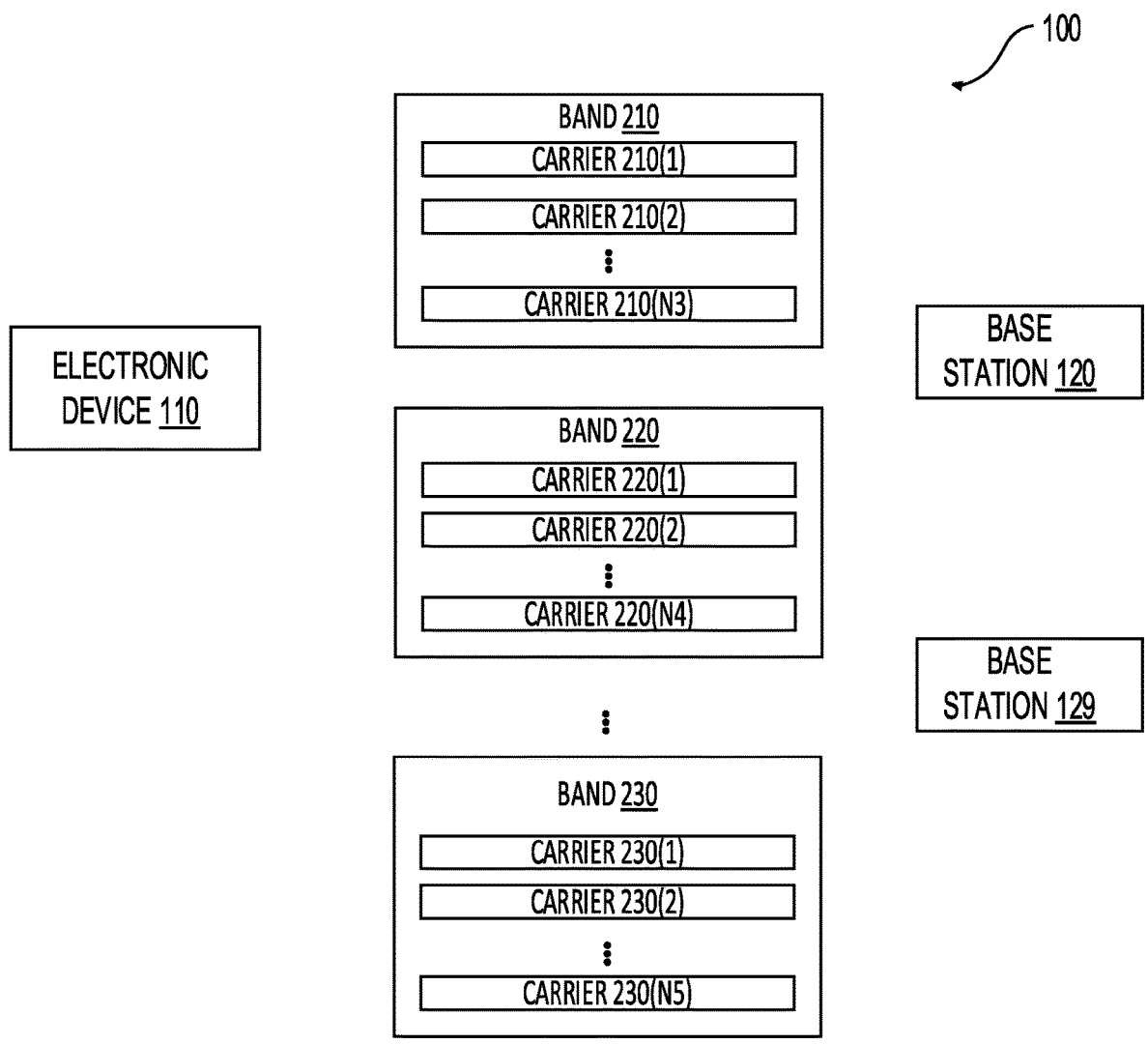
FIG. 2B shows an example of multiple frequency bands in a communication system according to an embodiment of the disclosure.

One or more frequency bands can be allocated for the electronic device 110. FIG. 2B shows an example of multiple frequency bands (also referred to as bands) in the communication system 100 according to an embodiment of the disclosure. The frequency band (or band) 210 includes a plurality of carriers 210(1)-210(N3) where N3 is a positive integer. The frequency band 220 includes a plurality of carriers 220(1)-220(N4) where N4 is a positive integer. The frequency band 230 includes a plurality of carriers 230(1)-230(N5) where N5 is a positive integer. Additional frequency band(s) can also be included in the communication system 100. Alternatively, less frequency band(s) can be included in the communication system 100. The electronic device 110 can support the band(s) 210, 220, and/or 230.

A plurality of the carriers 210(1)-210(N3), 220(1)-220(N4), and 230(1)-230(N5) in the bands 210, 220, and 230 can be configured between the electronic device 110 and one or more base stations, for example, using CA and/or DC. In an example, a first subset of the carriers 210(1)-210(N3) is configured between the electronic device 110 and the base station 120 using CA, and a second subset of the carriers 210(1)-210(N3) is configured between the electronic device 110 and the base station 129 using CA. Accordingly, the first subset and the second subset of the carriers 210(1)-210(N3) are configured for the electronic device 110 using DC. In an example, the band 210 is configured between the electronic device 110 and the base station 120, and the band 220 is configured between the electronic device 110 and the base station 129. In an example, the bands 210, 220, and 230 are configured between the electronic device 110 and the base station 120. In an example, the carrier 210(1), 220(3), and 230(2) are configured between the electronic device 110 and the base station 120 in CA.

In an example, the electronic device 110 deploys a plurality of the carriers 210(1)-210(N3) in the band 210. In an example, the electronic device 110 deploys a plurality of the carriers 210(1)-210(N3), 220(1)-220(N4), and 230(1)-230(N5), for example, depending on capability of the electronic device 110.

In an example, the electronic device 110 can be configured with multiple frequency ranges, such as FR1 and FR2. Within each of the multiple frequency ranges, one or more bands can be configured for the electronic device 110. For example, FR1 and FR2 are configured for the electronic device, FR1 includes the band 210, and FR2 includes the bands 220 and 230.

The electronic device 110 can be configured to communicate with the network 101 using a plurality of the cells 171(1)-171(N1) in the MCG 170 in CA. The electronic device 110 can be configured to communicate with the network 101 using the MCG 170 and SCG 180 in DC. The electronic device 110 can be configured to communicate with the network 101 via a plurality of the carriers 210(1)-

(N3), 220(1)-(N4), and 230(1)-(N5). The carriers 171(1)-171(N1), 181(1)-181(N2), 210(1)-(N3), 220(1)-(N4), and 230(1)-(N5) can include UL carriers for UL transmissions and DL carriers for DL transmissions. In an embodiment, an UL carrier can also be a DL carrier, such as a time-division duplex (TDD) carrier. In an embodiment, in a TDD carrier (or a TDD CC), UL and DL transmissions can be separated in a time domain. In an example, a TDD carrier is an UL carrier during an UL transmission and is a DL carrier during a DL transmission, and thus the TDD carrier includes alternate DL slots and UL slots or alternate DL symbols and UL symbols.

For a TDD carrier configured with UL channels, such as physical uplink control channel (PUCCH)/physical uplink share channel (PUSCH), UL signals such as an SRS can be transmitted in an UL transmission and provide channel quality information to the network 101, and thus DL beamforming in a DL transmission can exploit channel reciprocity based on the SRS in the same TDD carrier. As described above, the electronic device 110 can be configured with more DL carriers than UL carrier(s). Therefore, in an example, UL channels are not configured for a TDD carrier. [.] To improve DL beamforming performance in the TDD carrier not configured for PUSCH/PUCCH transmission, an SRS can be transmitted on the TDD carrier that is not configured for PUSCH/PUCCH transmission. Since the electronic device 110 may not have an UL CA capability to transmit SRSs simultaneously on multiple carriers (e.g., the TDD carrier that is not configured for PUSCH/PUCCH transmission and a TDD carrier configured with PUSCH/PUCCH/SRS), the electronic device 110 can implement an SRS transmission switching process. In an embodiment, the electronic device 110 can switch from a TDD carrier configured with PUSCH/PUCCH/SRS (also referred to as a 'switch-from' carrier or a first carrier) to a TDD carrier that is not configured for PUSCH/PUCCH transmission (also referred to as a 'switch-to' carrier or a second carrier) and transmit an SRS on the 'switch-to' carrier. In addition, when the SRS is transmitted on the 'switch-to' carrier, the electronic device 110 can temporarily suspend an UL transmission on the 'switch-from' carrier. In an example, the electronic device 110 switches back to the 'switch-from' carrier after transmitting the SRS on the 'switch-to' carrier. The above SRS transmission switching process can also be referred to as an SRS carrier switching process.

The electronic device 110 can receive signals with multiple antenna ports and transmits with a subset of the multiple antenna ports. The electronic device 110 can switch from a first antenna port to a second antenna port, then transmit an SRS on a carrier (also referred to as an aggressor carrier) using the second antenna port. Subsequently, the electronic device 110 can switch from the second antenna port back to the first antenna port. The above SRS transmission switching process can also be referred to as an SRS antenna switching process.

The electronic device 110 can be any suitable electronic device that can implement the SRS transmission switching procedure. In an example, the electronic device 110 is a terminal device (e.g., user equipment (UE)) for wireless communication, such as a cell phone, a mobile phone, a smart phone, a tablet computer, a laptop computer, a smart device, a wearable device, a device carried in a vehicle, and the like.

Referring to FIG. 1, the electronic device 110 can include a transceiver 130, processing circuitry 150, and memory 146 that are coupled together, for example, using a bus 145. The transceiver 130 is configured to receive and transmit wireless signals. In some embodiments, the transceiver 130 is configured to receive various reference signals (RSs) from the network 101 (e.g., the base station 120 and/or the base station 129). RSs can include a channel-state information reference signal (CSI-RS), a synchronization signal block (SSB), and the like. In some embodiments, an SSB that includes resources in time and frequency is formed with a primary synchronization signal (PSS), a secondary synchronization signal (SSS), and a Physical Broadcast Channel (PBCH). SSB(s) can be used in cell identification, beam measurements, beam management, and the like, for example, in 5GS including NR. In an embodiment, an SSB (or an SSB transmission) can have a higher priority than an SRS (or an SRS transmission), and thus when an SRS transmission switching process is scheduled at a same time with the SSB transmission, a portion of the SRS transmission can be discarded. The SSB transmission can include SSB symbol(s). The SSB transmission can further include data symbol(s) before the SSB symbol(s) and/or data symbol(s) after the SSB symbol(s). The SRS transmission switching process includes the SRS transmission, and optionally additional SRS transmission(s).

In general, a collision rule (or a priority rule, a dropping rule) for the electronic device 110 can be used to handle collision(s) between an SRS transmission (or an associated SRS transmission switching process) and other transmissions (e.g., an SSB, an LTE measurement). SSBs can be transmitted periodically, for example, based on a SSB Based radio resource measurement (RRM) Measurement Timing Configuration (SMTC) periodicity. The SMTC periodicity can use one of following values {5, 10, 20, 40, 80, and 160} milliseconds (ms).

The transceiver 130 can receive signals indicating an SRS switching command (e.g., an SRS carrier switching command, an SRS antenna switching command), the collision rule, a SRS antenna switching band impact rule or table (e.g., an SRS antenna switching impact table) from the network 101 (e.g., the base station 120), and/or the like. In an example, the SRS switching command is transmitted using Radio Resource Control (RRC). The transceiver 130 can receive signals associated with LTE measurements.

The transceiver 130 is configured to transmit various signals, such as an SRS that indicates channel quality information of a carrier to the network 101. Thus, DL beamforming in a DL transmission of the same carrier can exploit channel reciprocity based on the SRS in the UL transmission.

In an embodiment, the transceiver 130 includes a first transceiver 132 that transmits and receives LF signals (e.g., signals in the FR1, omnidirectional wireless signals) and a second transceiver 134 that transmits and receives the HF signals (e.g., signals in the FR2) including directional beams, such as the beams 111(1) and 121.

In an example, the transceiver 130 includes two sets of radio frequency (RF) transceivers, e.g., the first transceiver 132 to transmit and receive signals in FR1 and the second transceiver 134 to transmit and receive signals in FR2. The electronic device 110 can support a per-FR gap capability. In an example, the electronic device 110 does not support the per-FR gap capability.

In an example, the transceiver 130 only includes one transceiver that transmits and receives signals in both FR1 and FR2, and the electronic device 110 cannot support the per-FR gap capability.

The processing circuitry 150 can include a SRS transmission switching module 151 configured to implement the SRS transmission switching procedure. In some examples, an SRS scheduled to be transmitted can cause collision to other transmission/reception operations scheduled at a same time. The collision rule can be defined (e.g., pre-defined) or provided to the electronic device 110 so that an operation with a higher priority can be implemented and an operation with a lower priority can be dropped, discarded, or temporarily suspended. An operation having a high priority to be transmitted than the SRS can be referred to as a collision operation, a collision, a collision transmission, a collision reception, or a collision signal. The collision can include an SSB from the network 101 to the electronic device 110, acknowledgment (ACK), negative acknowledgment (NACK), an LTE measurement, or the like. In an example, the collision is a DL signal transmitted from the network to 101 the electronic device 110. In an example, the collision is an UL signal transmitted from the electronic device 110 to the network 101. Similarly as described above, the collision can include collision symbol(s) of the collision (e.g., SSB symbol(s)) and optionally guard symbol(s) before and/or after the collision symbol(s).

A set of carriers can be activated for the electronic device 110. The set of carriers can include a plurality of the carriers described above with reference to FIGS. 2A-2B. According to aspects of the disclosure, whether a collision is scheduled in one of the set of carriers at a same time with an SRS transmission switching process can be determined, for example, based on the collision rule. The SRS transmission switching process can include an SRS scheduled to be transmitted in a current carrier (or a second carrier, a 'switch-to' carrier) in the set of carriers. For example, the collision and the SRS transmission switching process are determined to be scheduled at the same time when the collision overlaps partially or completely with the SRS transmission switching process.

When no collision is determined to be scheduled in the set of carriers at the same time with the SRS transmission switching process, the SRS transmission switching process can be implemented by the processing circuitry 150. As the SRS transmission switching process can interrupt UL/DL transmissions on another one (referred to as a victim carrier or a victim cell) of the set of carriers, the processing circuitry 150 can determine an SRS interruption duration for the victim carrier to be interrupted by the SRS transmission switching process. The current carrier can also be referred to as an aggressor carrier or an aggressor cell. The SRS interruption duration for the victim carrier can be determined based on a SRS transmission switching duration, a timing between the SRS transmission switching process and the victim carrier, numerology of the victim carrier, numerology of the aggressor carrier, and/or the like. In an example, the SRS interruption duration for the victim carrier is determined based on numerology of the aggressor carrier and the numerology of the victim carrier. The numerology of the aggressor carrier can include a sub-carrier spacing (SCS) of the aggressor carrier and the numerology of the victim carrier can include a SCS of the victim carrier.

Figure 5A:
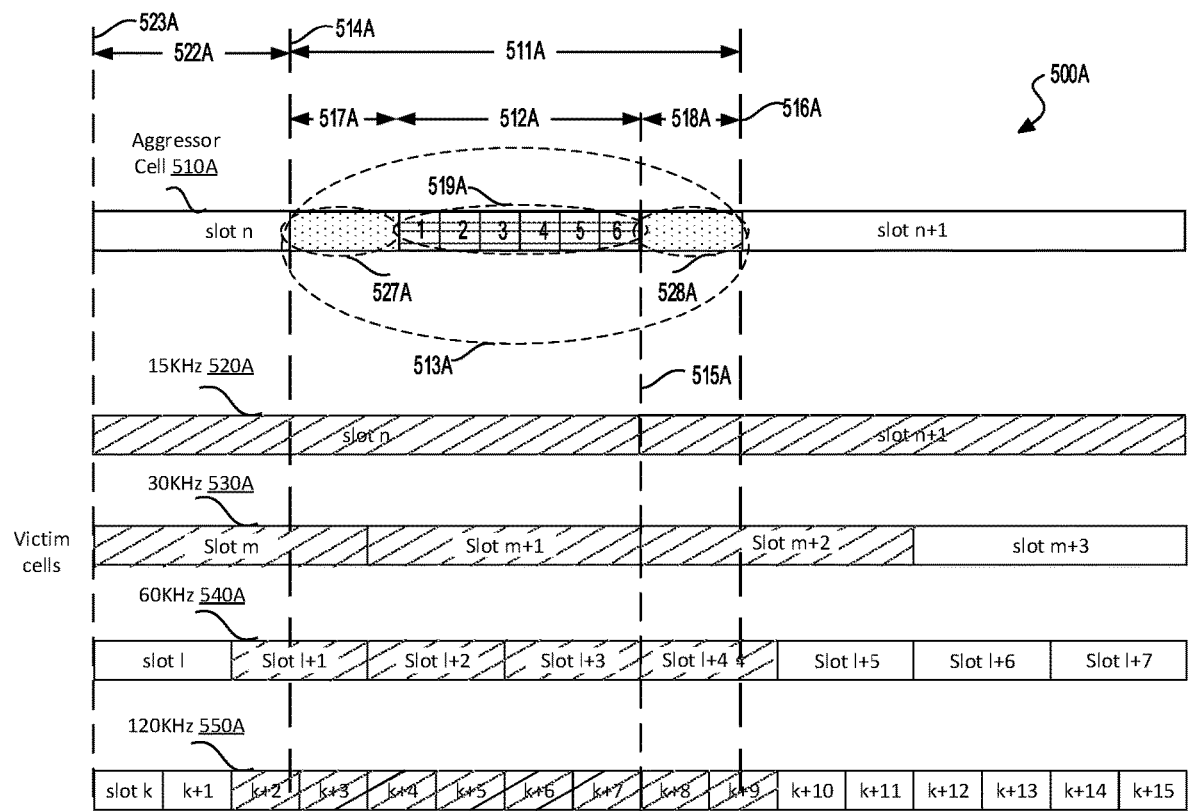
FIG. 5A shows an example 500A of SRS interruption durations for victim cells having different numerology according to an embodiment of the disclosure.

Referring to FIG. 5A, the SRS transmission 519A is scheduled to be transmitted on an aggressor carrier 510A that is one of the set of carriers activated for the electronic device 110. In an example, the SRS transmission switching process 513A starts from a starting time 514A and ends at an end time 516A, and includes a first switching step 527A, the SRS transmission 519A, and a second switching step 528A. The first switching step 527A can include switching from a 'switch-from' carrier to a 'switch-to' carrier (e.g., the aggressor cell 510A). The second switching step 528A can include switching from the aggressor cell 510A back to the 'switch-from' carrier. The SRS transmission 519A can include transmitting the SRS on the aggressor cell 510A. Accordingly, the SRS transmission switching duration 511A includes a first switching duration 517A for the first switching step 527A, an SRS transmission duration 512A for the SRS transmission 519A, and a second switching duration 518A for the second switching step 528A. The first switching duration 517A and the second switching duration 518A can be RF switching times for carrier-based switching, antenna switching times for antenna-based switching, or the like. The first switching duration 517A and the second switching duration 518A can be identical. An SRS switching duration can include the first switching duration 517A and the second switching duration 518A.

Any suitable number of SRS symbols can be included in the SRS transmission 519A. In an example, the number of SRS symbols in the SRS transmission 519A can be 1, 2, 3, 4, 5, or 6. The SRS transmission duration 512A can be associated with the number of SRS symbols and a numerology of the aggressor carrier 510A including a SCS. The SCS of the aggressor carrier 510A can be any suitable frequency. In an embodiment, the SCS of the aggressor carrier 510A is one of: 15 kHz, 30 kHz, 60 kHz, and 120 kHz. The SRS transmission duration 512A can be determined based on the number of SRS symbols and the numerology (e.g., the SCS) of the aggressor carrier 510A.

Referring to FIG. 5A, the SRS transmission 519A includes six SRS symbols 1-6 to be transmitted in a slot n (i.e., a positive integer) on the aggressor carrier 510A. As shown in FIG., 5A, a timing advance (TA) is not configured, and thus the last symbol (e.g., the symbol 6) of the SRS transmission 519A is the last symbol of the slot n. In other words, the symbol 6 is aligned with the last symbol of the slot n, as indicated by a line 515A.

The victim carrier can be different from the aggressor carrier 510A, and the numerology of the victim carrier can include a SCS. The SCS of the victim carrier can be any suitable frequency. In an example, the SCS of the victim carrier is one of: 15 kHz, 30 kHz, 60 kHz, and 120 kHz.

In an embodiment, the SRS interruption duration for the victim carrier is a number of slots in the victim carrier to be interrupted by the SRS transmission switching process 513A. The processing circuitry 150 can determine the number of slots for the victim carrier based on the SRS transmission switching duration 511A, the timing between the SRS transmission switching process 513A and the victim carrier, the numerology (e.g., the SCS) of the victim carrier, and/or the like. The timing between the SRS transmission switching process 513A and the victim carrier (e.g., 520A) can be indicated by, for example, a timing 522A between a starting time 523A of the slot n in the victim carrier 520A and the starting time 514A of the SRS transmission switching process 513A. The timing (e.g., 522A) can depend on various factors related to CA and/or DC, such as whether the aggressor carrier 510A and the victim carrier are synchronized or asynchronized, whether the TA is configured for, for example, the aggressor carrier 510A, and/or the like. As the SRS transmission duration 512A can be dependent on the numerology of the aggressor cell 510A, the number of slots in the victim cell can be determined based on the numerology (e.g., an SCS of 15 kHz) of the aggressor cell 510A and the numerology (e.g., an SCS of 15 kHz for 520A) of the victim cell.

Referring to FIG. 5A, the SCS (or aggressor SCS) of the aggressor carrier 510A is 15 kHz. The SCSs (or victim SCSs) of the victim carriers 520A, 530A, 540A, and 550A are 15 kHz, 30 kHz, 60 kHz, and 120 kHz, respectively. The aggressor carrier 510A and the victim carriers 520A, 530A, 540A, and 550A are synchronized and have the identical starting time 523A. For example, the slot n in the aggressor carrier 510A is synchronized with a slot n in the victim carrier 520A, a slot m (e.g., m=2n) in the victim carrier 530A, a slot 1 (e.g., 1=4n) in the victim carrier 540A, and a slot k (e.g., k=8n) in the victim carrier 550A. Accordingly, slots n and n+1 (i.e., 2 slots for the victim SCS of 15 kHz) can be interrupted in the victim carrier 520A by the SRS transmission switching process 513A. Slots m to m+2 (i.e., 3 slots for the victim SCS of 30 kHz) can be interrupted in the victim carrier 530A by the SRS transmission switching process 513A. Slots 1+1 to 1+4 (i.e., 4 slots for the victim SCS of 60 kHz) can be interrupted in the victim carrier 540A by the SRS transmission switching process 513A. Slots k+2 to k+9 (i.e., 8 slots for the victim SCS of 120 kHz) can be interrupted in the victim carrier 550A by the SRS transmission switching process 513A. In some examples, the number of slots to be interrupted in the victim cell can increase with the victim SCS.

Figure 6:
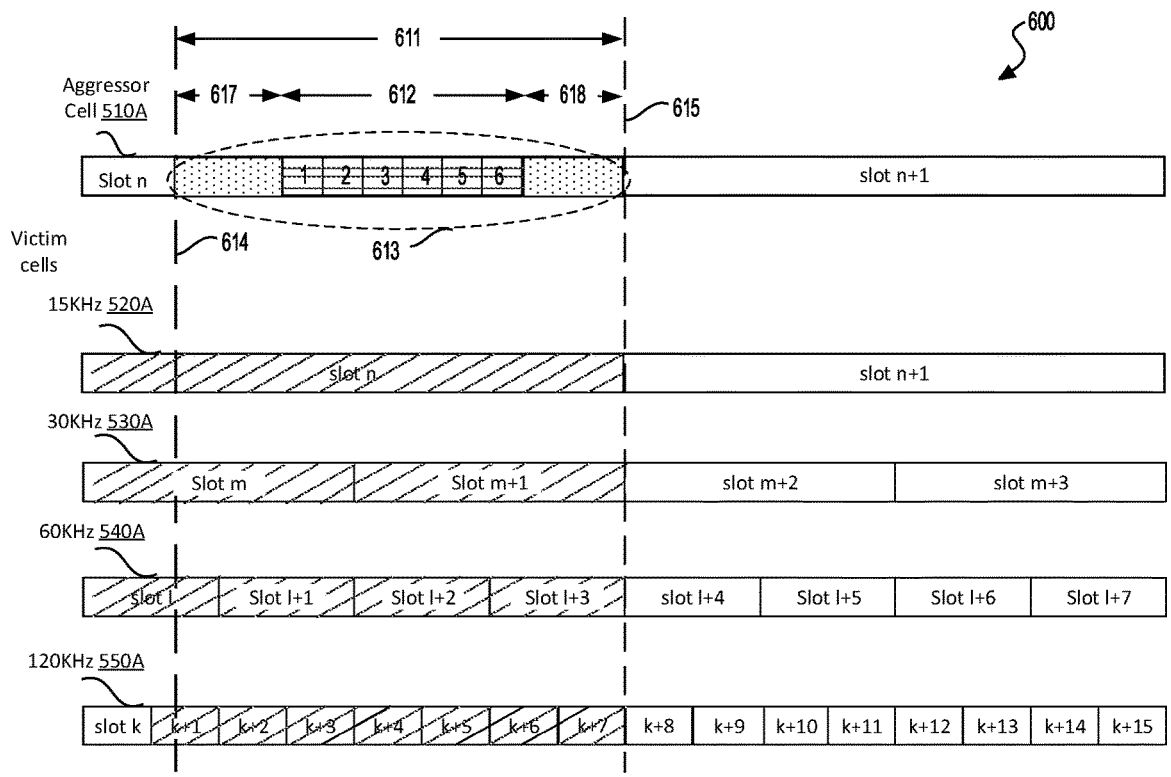
FIGS. 6-12 show examples of SRS interruption durations for victim cells having different numerology according to embodiments of the disclosure.

As described above, the number of slots for the victim carrier can depend on the timing between the SRS transmission switching process 513A and the victim carrier. Referring to FIG. 6, a TA (e.g., UL TA) is configured and a SRS transmission switching process 613 is time advanced on the aggressor carrier 510A such that an end time 615 of the SRS transmission switching process 613 is aligned with a boundary between the two adjacent slots n and n+1 in the aggressor cell 510A. In an example, an SRS transmission switching process can shift up to 2 slots in the aggressor cell 510A due to the TA. The SRS transmission switching process 613 is similar to the SRS transmission switching process 513A except the TA. Accordingly, the slot n (i.e., 1 slot for the victim SCS of 15 kHz) is interrupted in the victim carrier 520A by the SRS transmission switching process 613. The slots m to m+1 (i.e., 2 slots for the victim SCS of 30 kHz) can be interrupted in the victim carrier 530A by the SRS transmission switching process 613. The slots 1 to 1+3 (i.e., 4 slots for the victim SCS of 60 kHz) can be interrupted in the victim carrier 540A by the SRS transmission switching process 613. Slots k+1 to k+7 (i.e., 7 slots for the victim SCS of 120 kHz) can be interrupted in the victim carrier 550A by the SRS transmission switching process 613. Referring to FIGS. 5A and 6, the number of slots in the victim cell may change (e.g., decrease for the victim carriers 520A, 530A, and 550A) when the TA is configured. The number of slots in the victim cell 540A remains the same when the TA is configured. In some examples, a number of slots to be interrupted in a victim cell can increase when the TA is configured. For example, a number of slots increases from 2 for a victim cell 730 to 3 for a victim cell 830 due to TA.

The processing circuitry 150 can stop, drop, or temporarily suspend transmission(s)/reception(s) (e.g., DL/UL transmission(s)) scheduled in the SRS interruption duration (e.g., the number of slots to be interrupted by the SRS transmission switching process 513A or 613) on the victim carrier (e.g., 520A, 530A, 540A, or 550A in FIGS. 5A and 6). Referring to FIG. 5A, no DL/UL data is transmitted in the slots n to n+1 in the victim carrier 520A, no DL/UL data is transmitted in the slots m to m+2 in the victim carrier 530A, no DL/UL data is transmitted in the slots 1+1 to 1+4 in the victim carrier 540A, and no DL/UL data is transmitted in the slots k+2 to k+9 in the victim carrier 550A. Further, the scheduled SRS transmission 519A can be transmitted in the aggressor carrier 510A, for example, in the SRS transmission duration 512A.

Figure 5B:
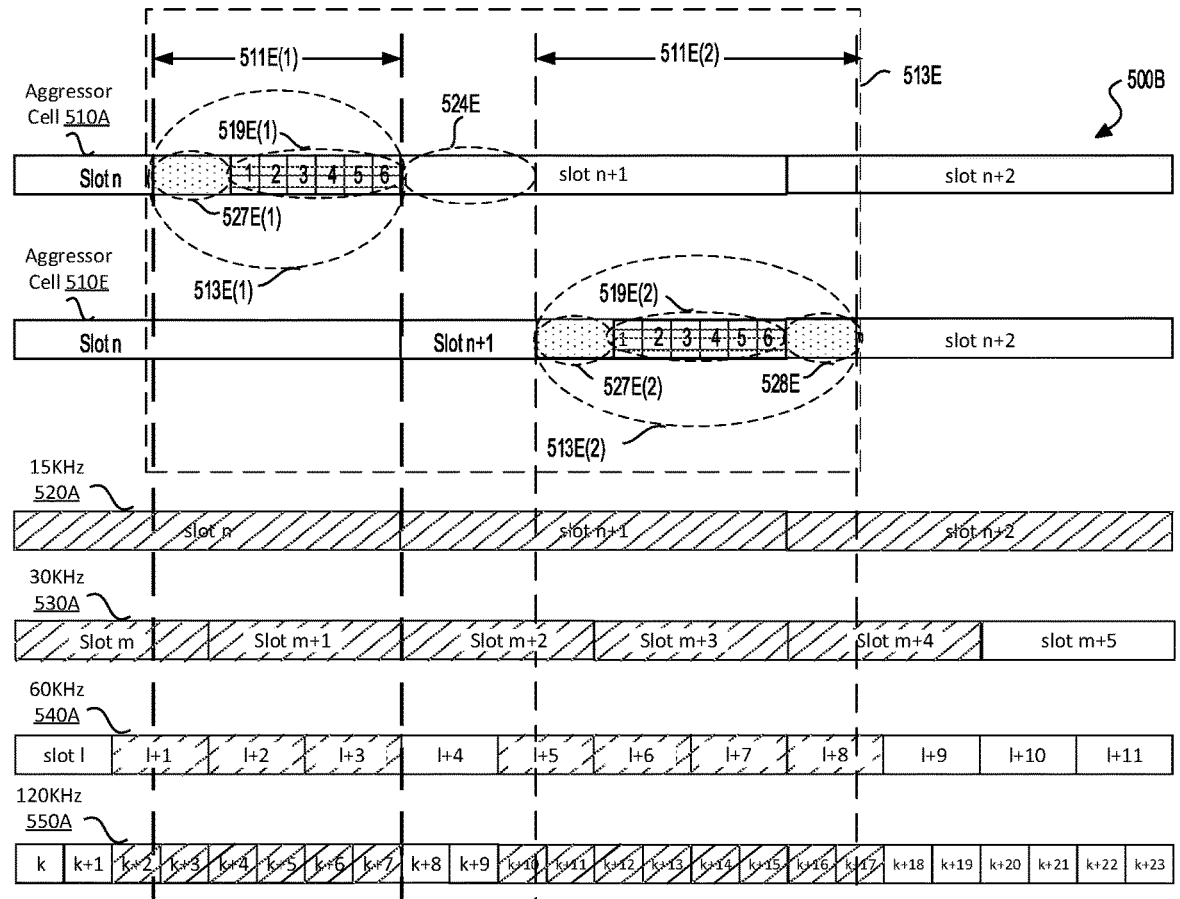
FIG. 5B shows an example 500B of SRS interruption durations for victim cells having different numerology according to an embodiment of the disclosure.
Figure 5C:
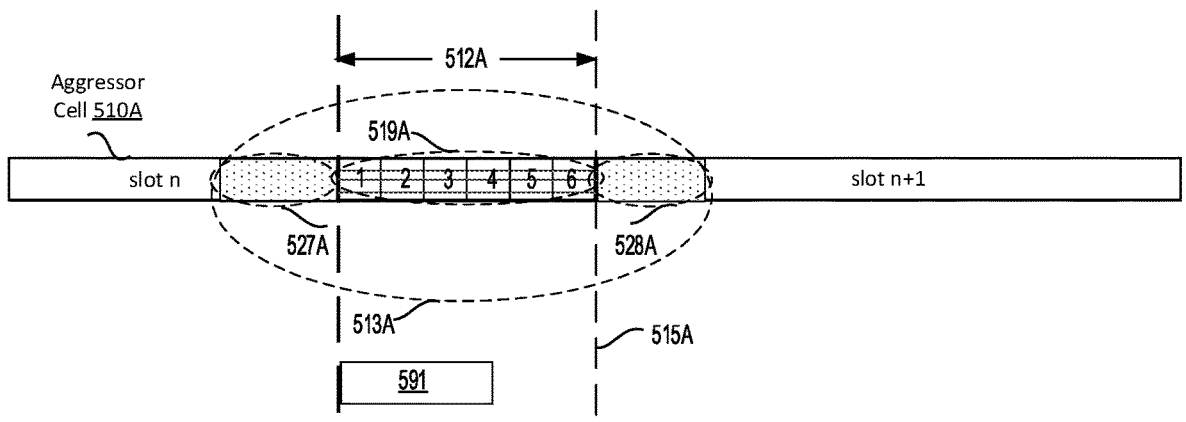
FIGS. 5C-5D show examples of collisions according to embodiments of the disclosure.
Figure 5D:
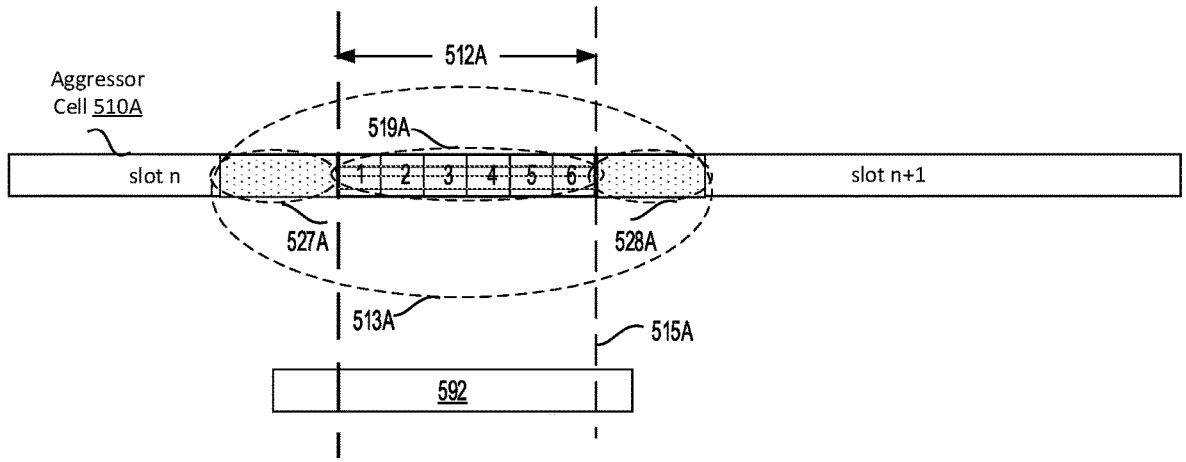

Referring to FIGS. 5C-5D, when the collision (e.g., 591 or 592) is determined to be scheduled in the one of the set of carriers at the same time with the SRS transmission switching process 513A, a portion of the SRS transmission 519A can be dropped or stopped from being transmitted in the aggressor carrier 510A where the portion of the SRS transmission 519A overlaps partially or completely with the collision.

Referring to FIG. 5C, the SRS transmission 519A includes multiple SRS symbols (e.g., the symbols 1-6). A subset (e.g., the symbols 1-4) of the multiple SRS symbols overlaps (or collides) with the collision 591, and thus can be dropped or discarded from being transmitted in the aggressor carrier 510A. A remaining subset (e.g., the symbols 5-6) of the multiple SRS symbols does not overlap with the collision 591, and thus can be transmitted on the aggressor carrier 510A. Alternatively, the scheduled SRS transmission 519A (e.g., including the symbols 1-6) can be dropped. In an example, an entire slot (e.g., the slot n) including the scheduled SRS transmission 519A is dropped and thus not transmitted. When the scheduled SRS transmission 519A is dropped and thus not transmitted, the first switching step 527A and the second switching step 528A can be dropped since no SRS transmission switching process is implemented.

Referring to FIG. 5D, the SRS transmission 519A includes multiple SRS symbols (e.g., the symbols 1-6) and the entire SRS transmission 519A overlaps with the collision 592. Thus, the SRS transmission 519A can be dropped or discarded from being transmitted in the aggressor carrier 510A. In an example, the slot n including the scheduled SRS transmission 519A is dropped.

In an example, when the collision is determined to be scheduled in the one of the set of carriers at the same time with an SRS transmission switching process (e.g., 513A) or a portion (e.g., a portion of the SRS transmission 519A, the SRS transmission 519A, the first switching step 527A, the second switching step 528A) of the SRS transmission switching process, the SRS transmission switching process can be dropped.

In an embodiment, referring back to FIG. 5A, the SRS transmission switching process 513A is a carrier-based SRS switching process (or SRS carrier switching process). The processing circuitry 150 can implement the carrier-based SRS switching process 513A as follows. The processing circuitry 150 can switch from a first carrier (e.g., a TDD carrier capable of PUSCH/PUCCH transmission, a 'switch-from' carrier) to a second carrier (e.g., a carrier that is not configured for PUSCH/PUCCH transmission) during the first switching step 527A, then transmit the scheduled SRS transmission 519A on the second carrier. Subsequently, the processing circuitry 150 can switch from the second carrier back to the first carrier during the second switching step 528A. In an example shown in FIG. 5A, the second carrier is the aggressor carrier 510A.

Referring to FIG. 5B, an SRS transmission switching process 513E includes multiple SRS sub-switching processes 513E(1)-513E(2). In addition to the aggressor cell 510A and the victim cells 520A, 530A, 540A, and 550A, an aggressor cell 510E having an SCS of 15 kHz is also shown in FIG. 5B. The aggressor cells 510A and 510E and the victim cells 520A, 530A, 540A, and 550A are synchronized.

The processing circuitry 150 can switch from a first carrier (or a 'switch-from' carrier, such as a TDD carrier configured with PUSCH/PUCCH/SRS) to a second carrier (or a first 'switch-to' carrier, the aggressor cell 510A, such as a TDD carrier that is not configured for PUSCH/PUCCH transmission) in a first switching step 527E(1), then transmit a first scheduled SRS transmission 519E(1) on the second carrier. Subsequently, the processing circuitry 150 can switch from the second carrier to a third carrier (or a second 'switch-to' carrier, the aggressor cell 510E, e.g., a carrier that is not configured for PUSCH/PUCCH transmission) in a second switching step 527E(2), then transmit a second scheduled SRS transmission 519E(2) on the third carrier. Subsequently, the processing circuitry 150 can switch from the third carrier back to the first carrier in a third switching step 528E. The above description can be suitably adapted to implement a SRS transmission switching process that includes any number of SRS sub-switching process(es).

SRS interruption durations (or numbers of slots to be interrupted by the SRS transmission switching process 513E) on the respective victim carriers 520A, 530A, 540A, and 550A can be determined similarly as described above with reference to FIG. 5A. Referring to FIG. 5B, slots n to n+2 (i.e., 3 slots for the victim SCS of 15 kHz) can be interrupted in the victim carrier 520A by the SRS transmission switching process 513E. Slots m to m+4 (i.e., 5 slots for the victim SCS of 30 kHz) can be interrupted in the victim carrier 530A by the SRS transmission switching process 513E. Slots l+1 to l+3 and l+5 to l+8 (i.e., 7 slots for the victim SCS of 60 kHz) can be interrupted in the victim carrier 540A by the SRS transmission switching process 513E. Slots k+2 to k+7 and k+10 to k+17 (i.e., 14 slots for the victim SCS of 120 kHz) can be interrupted in the victim carrier 550A by the SRS transmission switching process 513E.

Referring to FIG. 5B, an interruption gap 524E can be formed between the adjacent SRS sub-switching processes 513E(1)-513E(2). Accordingly, the slot l+4 on the victim carrier 540A and the slots k+8 to k+9 on the victim carrier 550A are not interrupted by the SRS transmission switching process 513E, and thus UL/DL transmissions can occur in the slot l+4 on the victim carrier 540A and/or the slots k+8 to k+9 on the victim carrier 550A. In an example, the SRS interruption duration on the victim cell (e.g., the victim cell 540A) is not continuous and is separated by slot(s) (e.g., the slot l+4) in the interruption gap 524E.

The above description with reference to FIG. 5B can be suitably adapted for different scenarios, such as described above. In an example, more aggressor cells are used for more SRS transmissions. The aggressor cells can have any suitably numerology (e.g., SCS of 15 kHz, 30 kHz, 60 kHz, 120 kHz). Numerology of the aggressor cells can be identical or different. Each of the SRS transmissions can include any suitable number of SRS symbols. The RF switching times (e.g., 527E(1), 527E(2), 528E) can be identical or different. The multiple SRS transmissions can be scheduled in adjacent slots across different aggressor carriers, such as shown in FIG. 5B. Alternatively, the multiple SRS transmissions can be scheduled in non-adjacent slots. The aggressor carriers and the victim carrier(s) can be synchronized (e.g., a last symbol of the first SRS transmission 519E(1) is aligned with the slot n in the aggressor cell 510A and a last symbol of the second SRS transmission 519E(2) is aligned with the slot (n+1) in the aggressor cell 510E) or asynchronized. DC and/or CA can be used for the aggressor cells and the victim cells. TA can also be configured.

Figure 14:
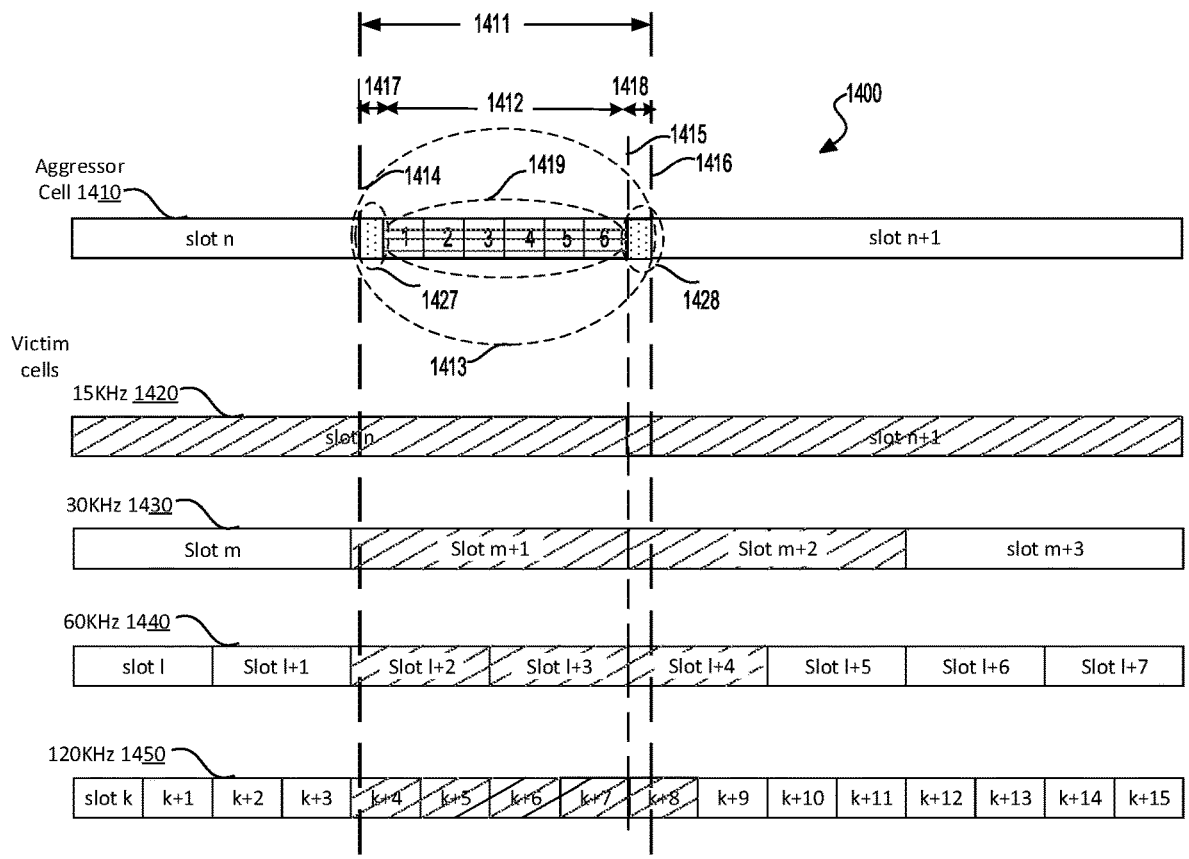
FIGS. 14-21 show examples of SRS interruption durations for victim cells having different numerology according to embodiments of the disclosure.

In an embodiment, the SRS transmission switching process is an antenna-based SRS switching process 1413 (or SRS antenna switching process). The processing circuitry 150 can implement the antenna-based SRS switching process 1413 starting at a time 1414 and ending at a time 1416 as follows. Referring to FIG. 14, the processing circuitry 150 can switch from a first antenna port to a second antenna port during a first switching step 1427, then transmit a scheduled SRS transmission 1419 using the second antenna port and on an aggressor carrier 1410. Subsequently, the processing circuitry 150 can switch from the second antenna port back to the first antenna port during a second switching step 1428. An SRS antenna switching duration can include a first antenna switching duration 1417 for the first switching step 1427 and a second antenna switching duration 1418 for the second switching step 1428. An SRS transmission switching duration 1411 for the aggressor carrier 1410 is a sum of an SRS transmission duration 1412 for the SRS transmission 1419 and the SRS antenna switching duration. The aggressor cell 1410 and the victim cells are synchronized and no TA is configured. A last symbol in the SRS transmission 1419 is aligned with a last symbol of a slot n in the aggressor cell 1410, as indicated by a line 1415.

In an example, one or more frequency bands are configured for the electronic device 110. The processing circuitry 150 can determine whether the antenna-based SRS switching process 1413 has an impact or affects the one or more frequency bands based on, for example, the antenna switching band impact rule or table from the network 101. When at least one of the one or more frequency bands is determined to be affected by the antenna-based SRS switching process 1413, for each frequency band (referred to as each affected band) affected by the antenna-based SRS switching process 1413, whether the collision is scheduled in one of activated carrier(s) in the affected band at a same time with the SRS antenna switching process 1413 can be determined. When no collision is determined to be scheduled in the activated carriers in the affected band(s) at the same time with the SRS antenna switching process 1413, the SRS antenna switching process 1413 can be implemented by the processing circuitry 150.

The processing circuitry 150 can be implemented using various techniques, such as integrated circuits, one or more processors executing software instructions, and the like.

The memory 146 can be any suitable device for storing data and instructions to control operations (e.g., the SRS transmission switching procedure) of the electronic device 110. In an example, the memory 146 stores information indicating impact characteristics (e.g., the antenna switching band impact rule or table) for the SRS transmission switching procedure, the collision rule, and software instructions to be executed by a processor, such as the processing circuitry 150.

In an embodiment, the memory 146 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

Figure 3:
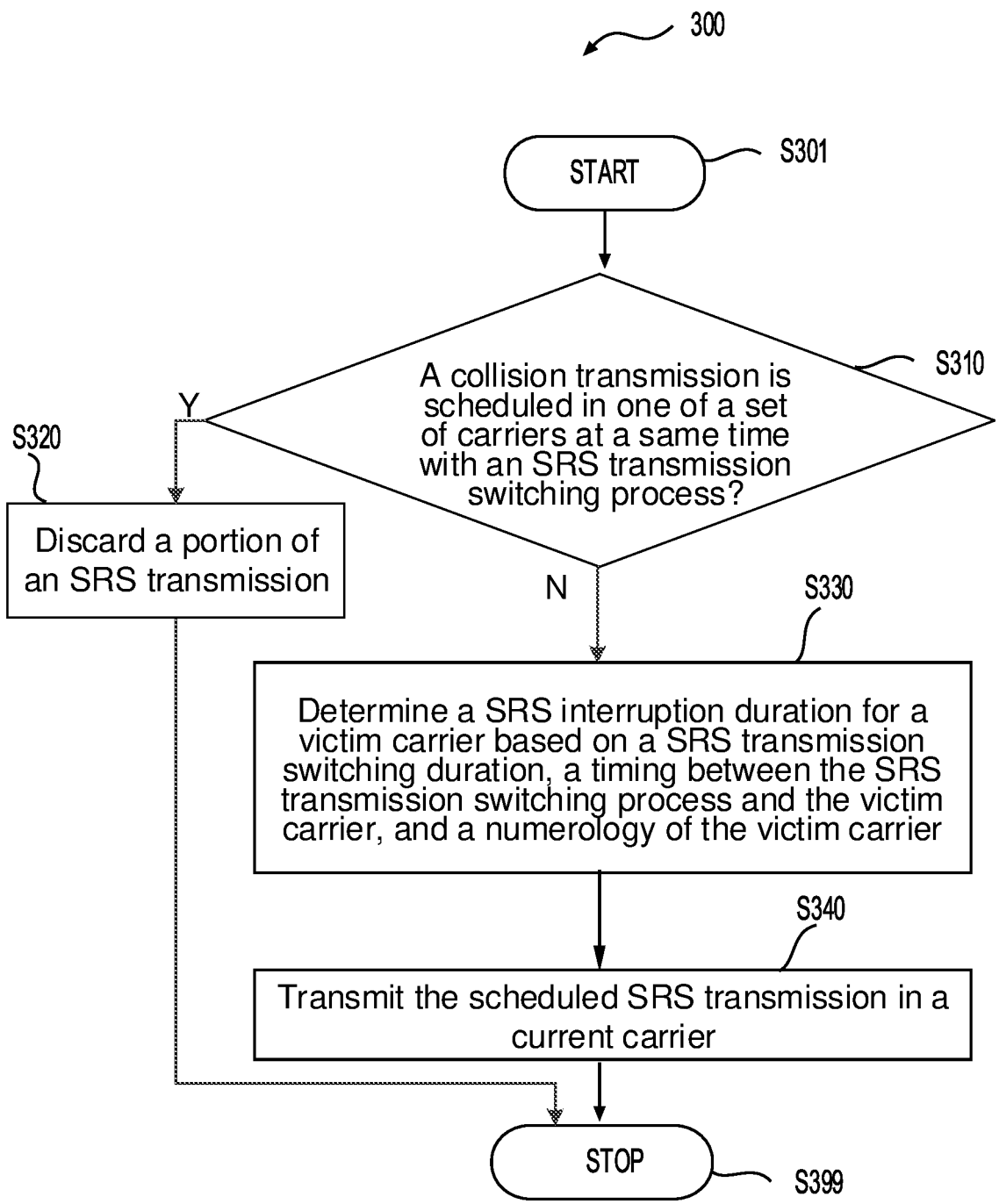
FIG. 3 shows a flowchart of an exemplary process 300 according to an embodiment of the disclosure.

FIG. 3 shows a flowchart of an exemplary process 300 according to an embodiment of the disclosure. The process 300 can be used to implement the SRS transmission switching procedure described above. In an example, an electronic device (e.g., the electronic device 110) is configured to perform the process 300. A set of carriers can be activated for the electronic device and the set of carriers can be configured in CA and/or DC. The set of carriers can include any suitable carriers described above, such as with reference to FIGS. 1, 2A and 2B. The process 300 starts at S301, and proceeds to S310.

At S310, whether a collision (e.g., an SSB) is scheduled in one of the set of carriers at a same time with an SRS transmission switching process (e.g., 513A, 513E, 613, 1413) can be determined, for example, based on the collision rule, as described above. The SRS transmission switching process can include an SRS transmission scheduled on a current carrier and optionally additional SRS transmission(s) scheduled on other carrier(s). The one of the set of carriers can be identical to or different from the current carrier. The current carrier can be a 'switch-to' carrier, a TDD carrier that is not configured for PUSCH/PUCCH transmission. S310 can be implemented for each of the set of carriers. When the collision is determined to be scheduled in the one of the set of carriers at the same time with the SRS transmission switching process, the process 300 proceeds to S320. Otherwise, when no collision is determined to be scheduled in the set of carriers at the same time with the SRS transmission switching process, the process 300 proceeds to S330.

At S320, a portion of the SRS transmission can be discarded, and thus not transmitted on the current carrier, as described above, for example, with reference to FIGS. 1, 5A-5D. The process 300 proceeds to S399 and terminates.

At S330, the SRS transmission switching process can be implemented, as described above, for example, with reference to FIGS. 1, 5A-5B, 6, and 14. In an example, an SRS interruption duration (e.g., the slots n to n+1 on the victim cell 520A) for a victim carrier (e.g., 520A) can be determined based on a SRS transmission switching duration (e.g., 511A), a timing (e.g., 522A) between the SRS transmission switching process (e.g., 513A) and the victim cell, a numerology (e.g., 15 kHz for 520A) of the victim cell, and/or the like, as described above.

The SRS transmission switching process can include multiple SRS sub-switching processes. Accordingly, the SRS interruption duration for the victim carrier can include discontinuous slots separated by interruption gap(s), such as the slots 1+1 to 1+3 and the slots 1+5 to 1+8 on the victim cell 540A that are separated by the interruption gap 524E.

At S340, the scheduled SRS transmission (e.g., 519A in FIG. 5A) can be transmitted on the current carrier (e.g., the aggressor carrier 510A). In an example, the additional SRS transmission(s) can be transmitted on the respective other carrier(s).

The process 300 can be suitably adapted by omitting certain step(s), combining certain steps, and/or adding step(s). For example, DL/UL data in the number of slots in the victim carrier is not transmitted, and thus DL/UL processes in the number of slots in the victim carrier are stopped. Further, for an SRS carrier-based switching process, UL transmission(s) on a 'switch-to' carrier from which the SRS is switched can be temporarily suspended or stopped. Further, any suitable order can be used to implement the process 300.

In an example, step S320, S330, and S340 are adapted as follows. Referring to FIG. 5C, the collision 591 (e.g., an SSB transmission) collides with a portion (e.g., the symbols 1-4) of the SRS transmission 519A. Thus, at S320, the portion (e.g., the symbols 1-4) of the SRS transmission 519A is discarded. At S330, the SRS interruption duration for the victim carrier can be further determined based on a remaining portion (e.g., the symbols 5-6) of the SRS transmission 519A instead of the SRS transmission 519A. At S340, the remaining portion (e.g., the symbols 5-6) of the SRS transmission 519A is transmitted since the symbols 5-6 do not overlap with the collision. Alternatively, the SRS interruption duration for the victim carrier can be further determined based on the overall SRS transmission.

Figure 4:
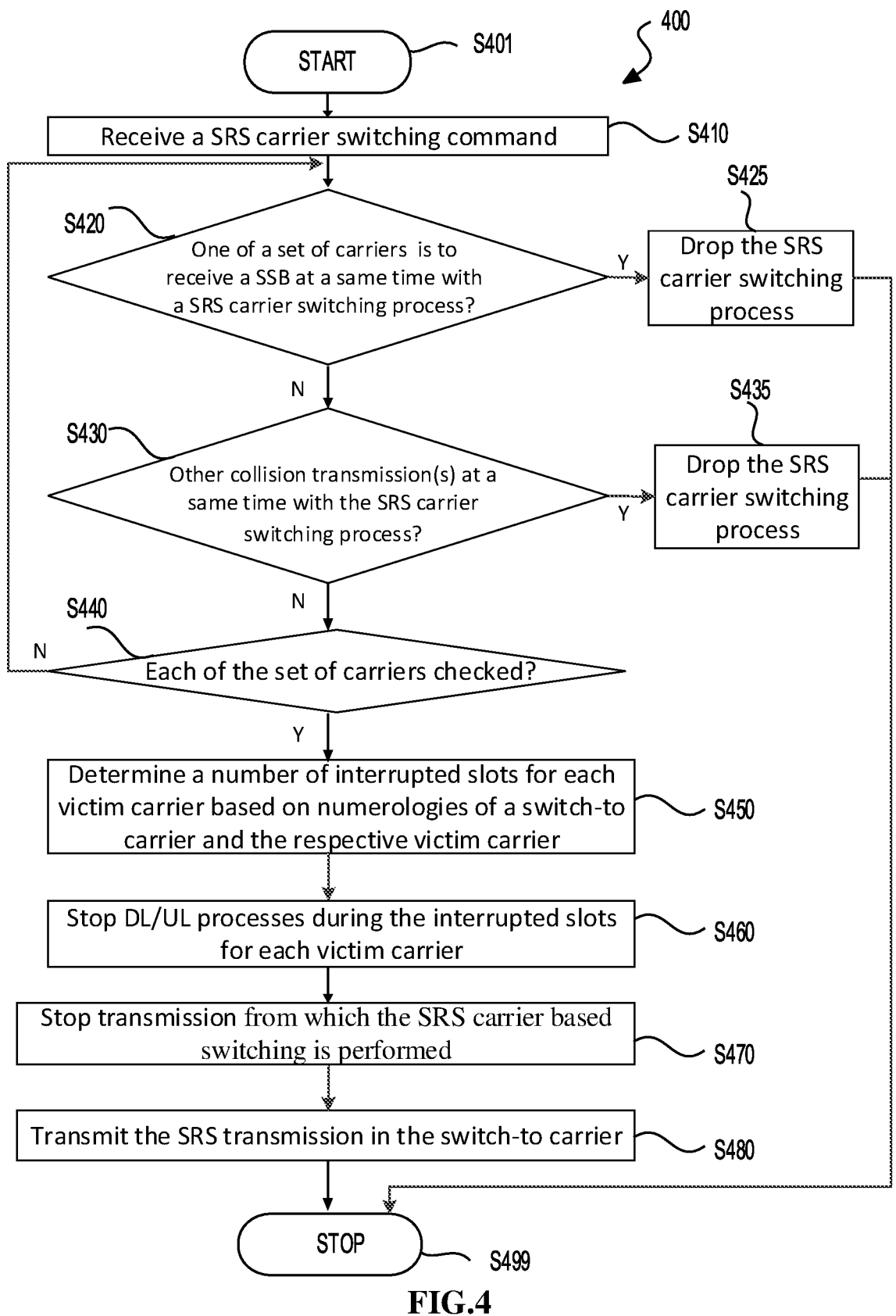
FIG. 4 shows a flowchart of an exemplary process 400 according to an embodiment of the disclosure.

FIG. 4 shows a flowchart of an exemplary process 400 according to an embodiment of the disclosure. The process 400 can be used to implement the SRS transmission switching procedure described above. In an embodiment, the SRS transmission switching procedure includes a SRS carrier-based switching process (also referred to as SRS carrier switching process) for SRS carrier switching. In an example, an electronic device or an UE (e.g., the electronic device 110) is configured to perform the process 400. A set of carriers can be activated for the electronic device and the set of carriers can be configured in CA and/or DC. The set of carriers can include any suitable carriers described above, such as with reference to FIGS. 1, 2A and 2B. The process 400 starts at S401, and proceeds to S410.

At S410, the UE can receive higher layer signaling (e.g., via RRC), such as a SRS carrier switching command, to configure an SRS transmission on a carrier (or a 'switch-to' carrier) without PUCCH/PUSCH transmission (e.g., a carrier that is not configured for PUSCH/PUCCH transmission). The carrier is one of the set of carriers activated for the UE. In an example, the SRS carrier switching command can configure additional SRS transmission(s) on additional 'switch-to' carrier(s) of the set of carriers activated for the UE.

At S420, the UE can determine whether one of the set of carriers receives an SSB at a same time with the SRS carrier switching process including based on the collision rule. The SRS carrier switching process can include a switching step (e.g., 527A in FIG. 5A) from a 'switch-from' carrier to the 'switch-to' carrier, an SRS transmission on the 'switch-to' carrier, and the like. When the one of the set of carriers is determined to receive the SSB at the same time with the SRS carrier switching process, the process 400 proceeds to S425. Otherwise, the process 400 proceeds to S430.

At S425, the UE can drop the SRS carrier switching process (e.g., the SRS carrier switching process 513A in FIG. 5A) in a corresponding slot (e.g., the slot n in the aggressor carrier 510A in FIG. 5A). The process 400 proceeds to S499 and terminates.

At S430, the UE can check other collisions for the SRS transmission switching process. For example, the UE can determine whether other collision(s) (e.g., an LTE measurement) occur at a same time with the SRS carrier switching process based on the collision rule, similarly as those described in S420. When the SRS transmission is determined to have a lower priority than the other collision(s) occurring at the same time with the SRS carrier switching process, the process 400 proceeds to S435. Otherwise, the process 400 proceeds to S440.

At S435, the UE can drop the SRS carrier switching process in the corresponding slot, similarly as that described in S425. The process 400 proceeds to S499 and terminates.

At S440, the UE can determine whether each of the set of carriers is checked. When each of the set of carriers is checked, the process 400 proceeds to S450. Otherwise, the process 400 returns to S420 to check another one of the set of carriers.

At S450, the UE can determine a number of slots to be interrupted in each victim carrier of the set of carrier based on the numerology of the victim carrier, the numerology of the 'switch-to' carrier for the SRS transmission, numerology of the additional 'switch-to' carrier(s), parameters indicating an UL TA timing, CA or DC, synchronization or asynchronization DC, and/or the like.

At S460, for each victim carrier, the UE can stop UL/DL transmission(s) or processes for the number of slots to be interrupted in the respective victim carrier.

At S470, the UE can stop transmission from which the SRS carrier based switching is performed.

At S480, the UE can transmit the SRS transmission on the 'switch-to' carrier that is not configured with PUCCH/PUSCH transmission (e.g., a TDD carrier that is not configured for PUSCH/PUCCH transmission).

The process 400 can be suitably adapted by omitting certain step(s), combining certain steps, and/or adding step(s). Any suitable order can be used to implement the process 400. In an example, S460 is implemented prior to S470. Alternatively, S470 is implemented prior to S460

In an example, step S425, S435, S450, and S480 are adapted as follows. At S425 and/or S435, the UE only drops SRS symbols in the SRS that collides with the SSB and/or the other collision(s). At S450, the UE determine the number of slots to be interrupted based on other SRS symbols in the SRS instead of the entire SRS. At S480, the UE transmits remaining SRS symbol(s) not colliding with the SSB and/or the other collision(s).

Alternatively, when one of the victim cell(s) is not in a range with the 'switch-to' carrier and the UE supports the per-FR gap capability, the victim cell can experience no interruption. Accordingly, S450 and S460 can be omitted for the victim cell.

In an example, the 5G NR system is designed to transmit an SRS in the last several symbols in a slot. An UE with fewer UL CCs than DL CCs in TDD can use SRS CC switching to sound on possibly all CCs, thus providing the network with more accurate CSI on the CCs for better beamforming in DL. The SRS carrier switching process can impact other active carriers' transmission/receiving processes based on the RF design.

In an example, a scheduling process used to check whether an SSB received on other carriers overlaps with the SRS carrier switching process. Further, the UE can determine a number of interrupted slots for each victim carrier based on a searching table, a real decision system based on the numerology of victim carrier(s) and aggressor carrier, and/or the like. The UL TA or asynchronization DC can affect the number of interrupted slots for victim cell/carrier.

SRS carrier-based switching processes can be illustrated using FIGS. 5A and 6-12 according to embodiments of the disclosure. FIG. 5A shows an example 500A of the victim cells 520A, 530A, 540A, and 550A having different numerology with the SCS of the aggressor cell 510A being 15 kHz according to an embodiment of the disclosure. The first switching duration 517A and the second switching duration 518A can be identical and referred to as an RF switching time. The SRS transmission switching duration 511A (also referred to as an SRS transmission process time) includes 2 times the RF switching time plus the SRS transmission time 519A on the aggressor cell 510A. The RF switching time can be any suitable time or duration. The RF switching time is 200 micro-seconds (us) in FIG. 5A. In an embodiment, the RF switching time is one of: 0 us, 30 us, 100 us, 140 us, 200 us, 300 us, 500 us, and 900 us.

In an embodiment, the RF switching time in FR1 and FR2 can depend on intra-band and inter-band. For switching between carriers in the same band (i.e., intra-band), the candidate values for the RF switching time can be 0 us, 30 us, 100 us, 140 us and 200 us depending on UE capability. For switching between carriers/aggregated carriers in different bands (i.e., inter-band), the candidate values for the RF switching time can be 0 us, 30 us, 100 us, 140 us, 200 us, 300 us, 500 us and 900 us depending on UE capability.

For the aggressor cell 510A, an interruption length can start from the slot n (or slot #n) and end in slot #n+1. The number of the interrupted slot(s) can be different for the victim cells depending on the victim SCSs.

As described above, in one embodiment, the victim cell SCS is 15 kHz for the victim cell 520A, the interrupted slots can be slot #n and slot #n+1. In an embodiment, the victim cell SCS is 30 kHz for the victim cell 530A, the interrupted slots can be slot #m, slot #m+1, and slot #m+2. In an embodiment, the victim cell SCS is 60 kHz for the victim cell 540A, the interrupted slots can be from slot #l+1 to slot #l+4. In an embodiment, the victim cell SCS is 120 kHz for the victim cell 550A, the interrupted slots can be from slot #k+2, to slot #k+9.

Alternatively, the UE or the electronic device 110 can have the same interrupted slots in the victim cell(s) for the aggressor cell 510A with SCS of 15 kHz in a DC scenario.

Alternatively, the victim cell(s) not in a same frequency range with the aggressor cell 510A can experience no interruption, for example, when the UE or the electronic device 110 supports the per-FR gap capability. Accordingly, the number of slots to be interrupted in the victim cell is 0.

FIG. 6 shows an example 600 of the victim cells 520A, 530A, 540A, and 550A and the aggressor cell 510A according to an embodiment of the disclosure. As described above, in FIG. 6, the UL TA is configured in the aggressor cell 510A. In an example, the last symbol (e.g., symbol 6) of the SRS transmission is not aligned with the last symbol in the slot n. The SRS transmission process time 611 includes 2 times the RF switching time (e.g., 617 and 618) plus the SRS transmission time 612 in the aggressor cell 510A. The RF switching time can be any suitable time or duration. The RF switching time is 200 micro-seconds (us) in FIG. 6. In an embodiment, the RF switching time is one of: 0 us, 30 us, 100 us, 140 us, 200 us, 300 us, 500 us, and 900 us. However, for the aggressor cell 510A, an interruption length can start from the slot n (or slot #n) and end in slot #n due to the UL TA.

The number of the interrupted slot(s) can be different for the victim cells depending on the victim SCSs. Further, the number of the interrupted slot(s) can be different for the same victim cell due to the UL TA.

In one embodiment, the victim cell SCS is 15 kHz for the victim cell 520A, the interrupted slot can be slot #n. In an embodiment, the victim cell SCS is 30 kHz for the victim cell 530A, the interrupted slots can be slot #m and slot #m+1. In an embodiment, the victim cell SCS is 60 kHz for the victim cell 540A, the interrupted slots can be from slot #l to slot #l+3. In an embodiment, the victim cell SCS is 120 kHz for the victim cell 550A, the interrupted slots can be from slot #k+1 to slot #k+7.

Alternatively, the UE or the electronic device 110 can have the same interrupted slots in the victim cell(s) for the aggressor cell 510A with SCS of 15 kHz in a asynchronization DC scenario.

Alternatively, the victim cell(s) in a different frequency range from the aggressor cell 510A can experience no interruption, for example, when the UE or the electronic device 110 supports the per-FR gap capability. Accordingly, the number of slots to be interrupted in the victim cell is 0.

Figure 7:
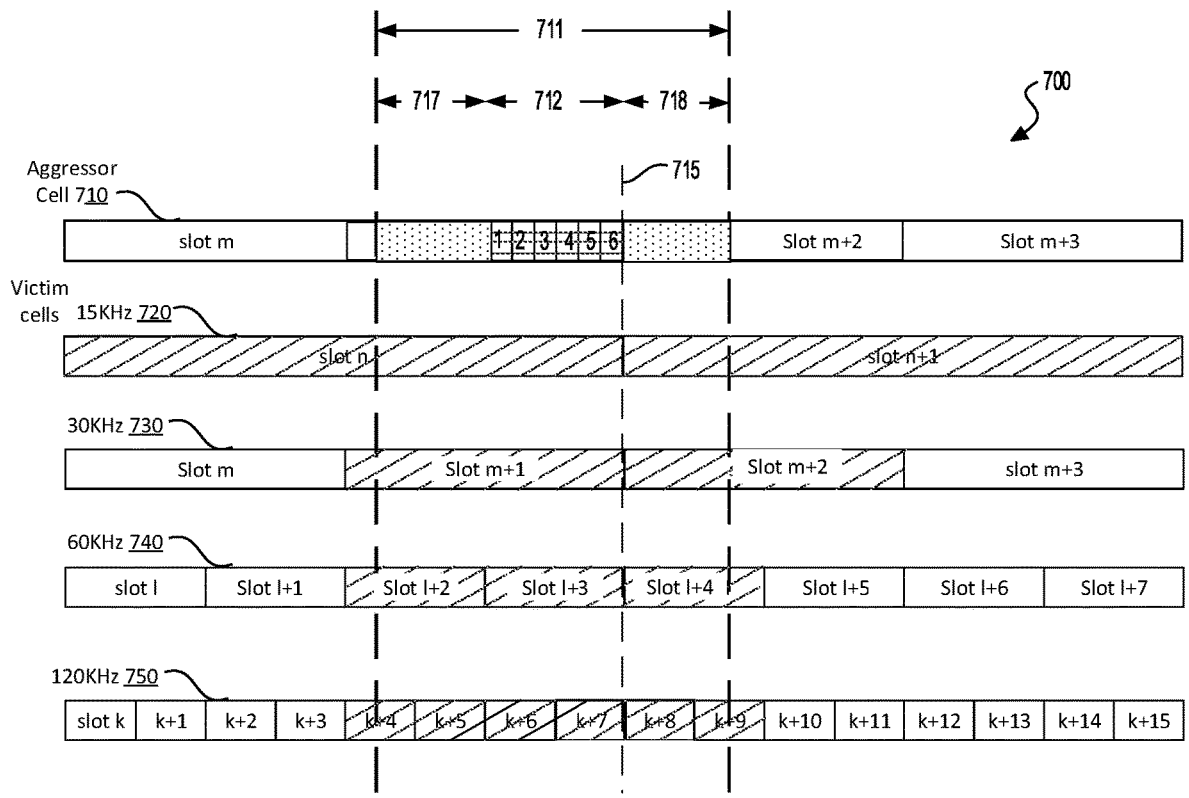

FIG. 7 shows an example 700 of victim cells 720, 730, 740, and 750 having different numerology and an aggressor cell 710 having an SCS of 30 kHz according to an embodiment of the disclosure. An SRS transmission process time 711 includes 2 times the RF switching time (e.g., 717 and 718) plus an SRS transmission time 712 in the aggressor cell 710. The RF switching time can be any suitable time or duration. A last symbol of the SRS transmission is aligned with a last symbol of the slot m+1 as indicated by a line 715. The RF switching time is 200 micro-seconds (us) in FIG. 7. In an embodiment, the RF switching time is one of: 0 us, 30 us, 100 us, 140 us, 200 us, 300 us, 500 us, and 900 us. For the aggressor cell 710, an interruption length can start from a slot #m+1 and end in a slot #m+2.

Numbers of interrupted slot(s) can be different for the victim cells depending on the victim SCSs. In an embodiment, the victim cell SCS is 15 kHz for the victim cell 720, the interrupted slots can be slots #n and #n+1. In an embodiment, the victim cell SCS is 30 kHz for the victim cell 730, the interrupted slots can be slot #m+1 and slot #m+2. In an embodiment, the victim cell SCS is 60 kHz for the victim cell 740, the interrupted slots can be from slot #l+2 to slot #l+4. In an embodiment, the victim cell SCS is 120 kHz for the victim cell 750, the interrupted slots can be from slot #k+4 to slot #k+9.

Alternatively, the UE or the electronic device 110 can have the same interrupted slots in the victim cell(s) for the aggressor cell 710 with SCS of 30 kHz in a DC scenario.

Alternatively, the victim cell(s) in a different frequency range from the aggressor cell 710 can experience no interruption, for example, when the UE or the electronic device 110 supports the per-FR gap capability. Accordingly, the number of slots to be interrupted in the victim cell is 0.

Figure 8:
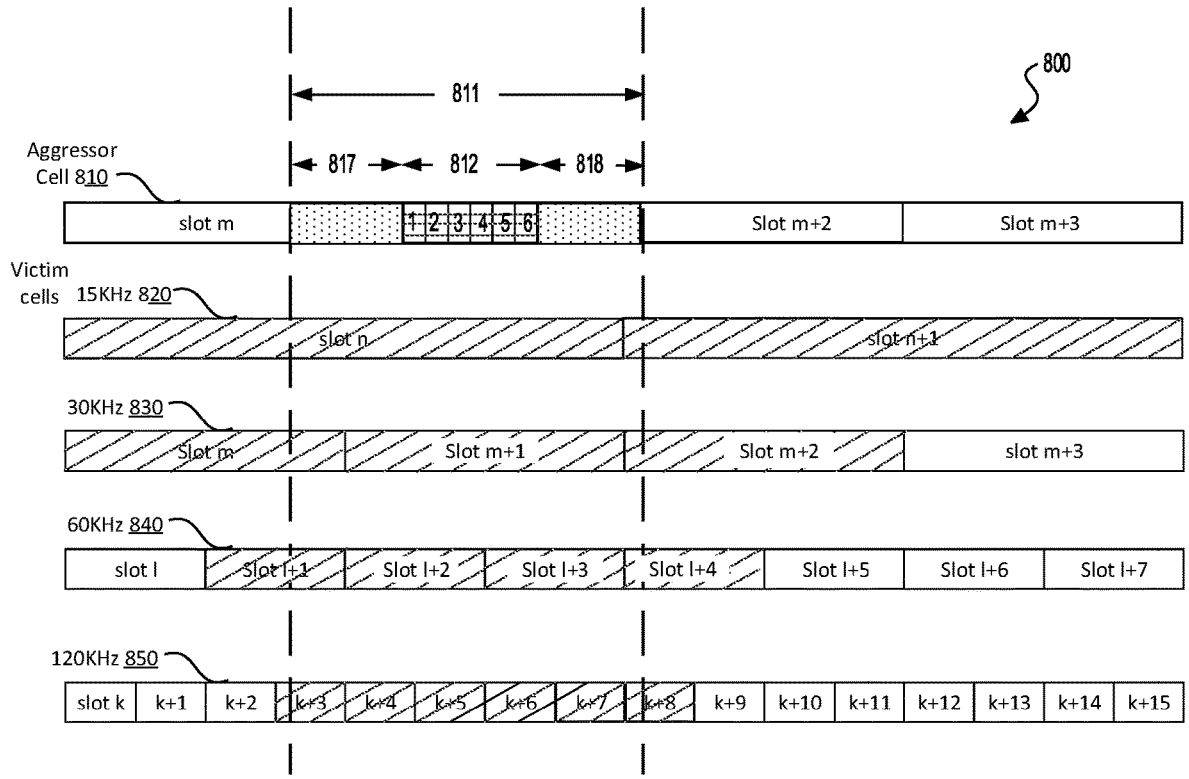

FIG. 8 shows an example 800 of victim cells 820, 830, 840, and 850 having different numerology and an aggressor cell 810 having an SCS of 30 kHz according to an embodiment of the disclosure. An UL TA is configured in the aggressor cell 810. In an example, the last symbol (e.g., symbol 6) of the SRS transmission is not aligned with the last symbol in the slot m+1. An SRS transmission process time 811 includes 2 times the RF switching time (e.g., 817 and 818) plus an SRS transmission time 812 in the aggressor cell 810. The RF switching time can be any suitable time or duration. The RF switching time is 200 micro-seconds (us) in FIG. 8. In an embodiment, the RF switching time is one of: 0 us, 30 us, 100 us, 140 us, 200 us, 300 us, 500 us, and 900 us. For the aggressor cell 810, an interruption length can start from a slot #m and end in a slot #m+2 due to the UL TA. Comparing FIGS. 7 and 8, the number of slots to be interrupted in the victim cell 830 increases to 3 slots from 2 slots for the victim cell 730 due to the UL TA.

Numbers of interrupted slot(s) can be different for the victim cells depending on the victim SCSs. In an embodiment, the victim cell SCS is 15 kHz for the victim cell 820, the interrupted slots can be slots #n and #n+1. In an embodiment, the victim cell SCS is 30 kHz for the victim cell 830, the interrupted slots can be slot #m to slot #m+2. In an embodiment, the victim cell SCS is 60 kHz for the victim cell 840, the interrupted slots can be from slot #l+1 to slot #l+4. In an embodiment, the victim cell SCS is 120 kHz for the victim cell 850, the interrupted slots can be from slot #k+3 to slot #k+8.

Alternatively, the UE or the electronic device 110 can have the same interrupted slots in the victim cell(s) for the aggressor cell 810 with SCS of 30 kHz in an asynchronization DC scenario.

Alternatively, the victim cell(s) in a different frequency range from the aggressor cell 810 can experience no interruption, for example, when the UE or the electronic device 110 supports the per-FR gap capability. Accordingly, the number of slots to be interrupted in the victim cell is 0.

Figure 9:
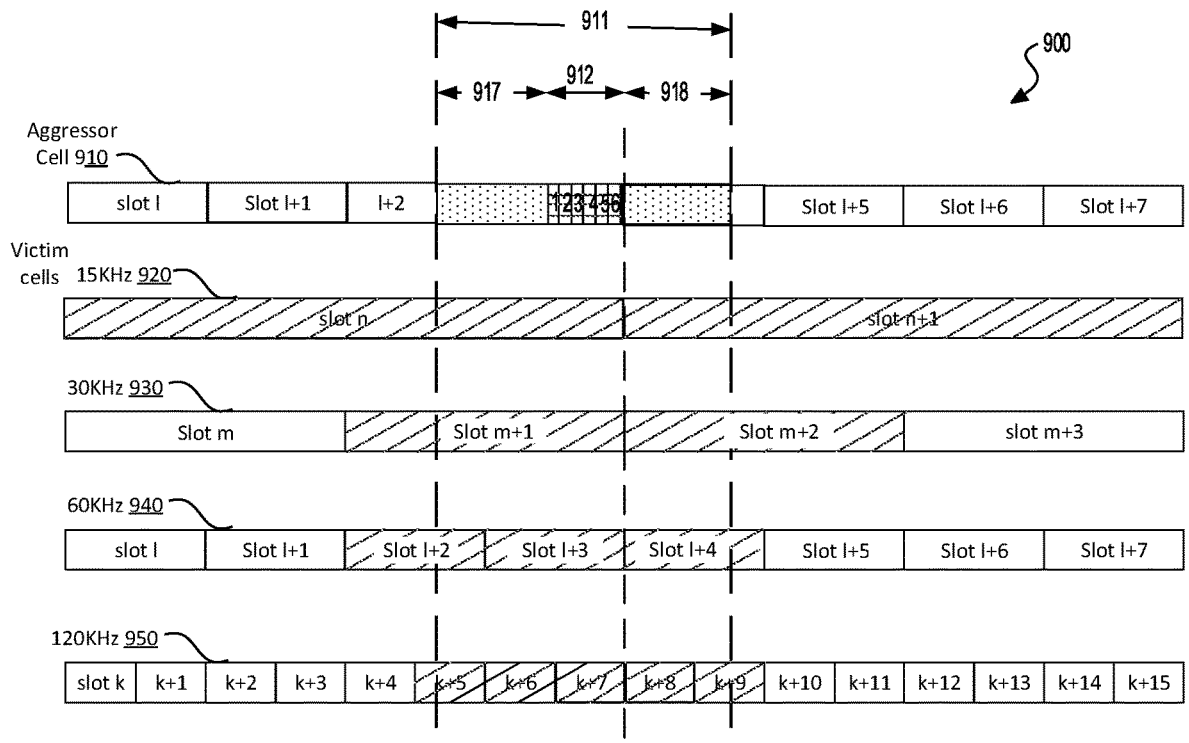

FIG. 9 shows an example 900 of victim cells 920, 930, 940, and 950 having different numerology and an aggressor cell 910 having an SCS of 60 kHz according to an embodiment of the disclosure. An SRS transmission process time 911 includes 2 times the RF switching time (e.g., 917 and 918) plus an SRS transmission time 912 in the aggressor cell 910. The RF switching time can be any suitable time or duration. The RF switching time is 200 micro-seconds (us) in FIG. 9. In an embodiment, the RF switching time is one of: 0 us, 30 us, 100 us, 140 us, 200 us, 300 us, 500 us, and 900 us. For the aggressor cell 910, an interruption length can start from a slot #l+2 and end in a slot #l+4.

Numbers of interrupted slot(s) can be different for the victim cells depending on the victim SCSs. In an embodiment, the victim cell SCS is 15 kHz for the victim cell 920, the interrupted slots can be slots #n and #n+1. In an embodiment, the victim cell SCS is 30 kHz for the victim cell 930, the interrupted slots can be slot #m+1 and slot #m+2. In an embodiment, the victim cell SCS is 60 kHz for the victim cell 940, the interrupted slots can be from slot #l+2 to slot #l+4. In an embodiment, the victim cell SCS is 120 kHz for the victim cell 950, the interrupted slots can be from slot #k+5 to slot #k+9.

Alternatively, the UE or the electronic device 110 can have the same interrupted slots in the victim cell(s) for the aggressor cell 910 with SCS of 60 KHz in a DC scenario Alternatively, the victim cell(s) in a different frequency range from the aggressor cell 910 can experience no interruption, for example, when the UE or the electronic device 110 supports the per-FR gap capability. Accordingly, the number of slots to be interrupted in the victim cell is 0.

Figure 10:
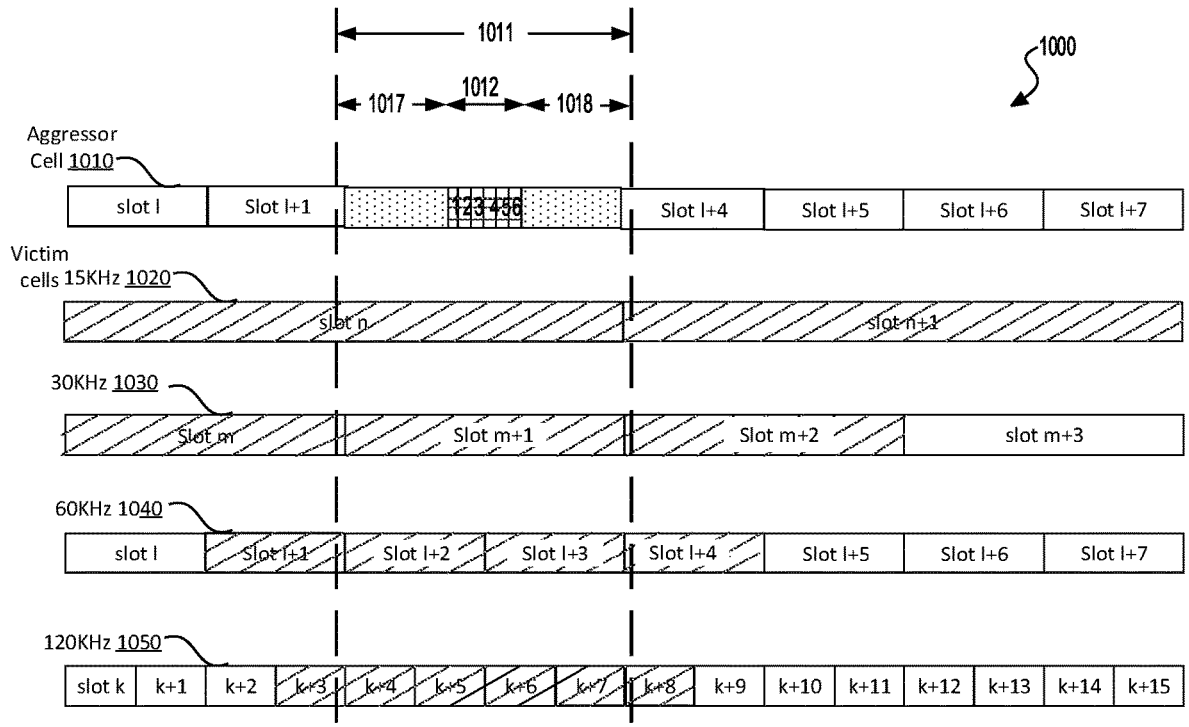

FIG. 10 shows an example 1000 of victim cells 1020, 1030, 1040, and 1050 having different numerology and an aggressor cell 1010 having an SCS of 60 kHz according to an embodiment of the disclosure. An UL TA is configured in the aggressor cell 1010. An SRS transmission process time 1011 includes 2 times the RF switching time (e.g., 1017 and 1018) plus an SRS transmission time 1012 in the aggressor cell 1010. The RF switching time can be any suitable time or duration. The RF switching time is 200 micro-seconds (us) in FIG. 10. In an embodiment, the RF switching time is one of: 0 us, 30 us, 100 us, 140 us, 200 us, 300 us, 500 us, and 900 us. For the aggressor cell 1010, an interruption length can start from a slot #l+1 and end in a slot #l+4 due to the UL TA.

Numbers of interrupted slot(s) can be different for the victim cells depending on the victim SCSs. In an embodiment, the victim cell SCS is 15 kHz for the victim cell 1020, the interrupted slots can be slots #n and #n+1. In an embodiment, the victim cell SCS is 30 kHz for the victim cell 1030, the interrupted slots can be slot #m to slot #m+2. In an embodiment, the victim cell SCS is 60 kHz for the victim cell 1040, the interrupted slots can be from slot #l+1 to slot #l+4. In an embodiment, the victim cell SCS is 120 kHz for the victim cell 1050, the interrupted slots can be from slot #k+3 to slot #k+8.

Alternatively, the UE or the electronic device 110 can have the same interrupted slots in the victim cell(s) for the aggressor cell 1010 with SCS of 60 kHz in an asynchronization DC scenario.

Alternatively, the victim cell(s) in a different frequency range from the aggressor cell 1010 can experience no interruption, for example, when the UE or the electronic device 110 supports the per-FR gap capability. Accordingly, the number of slots to be interrupted in the victim cell is 0.

Figure 11:
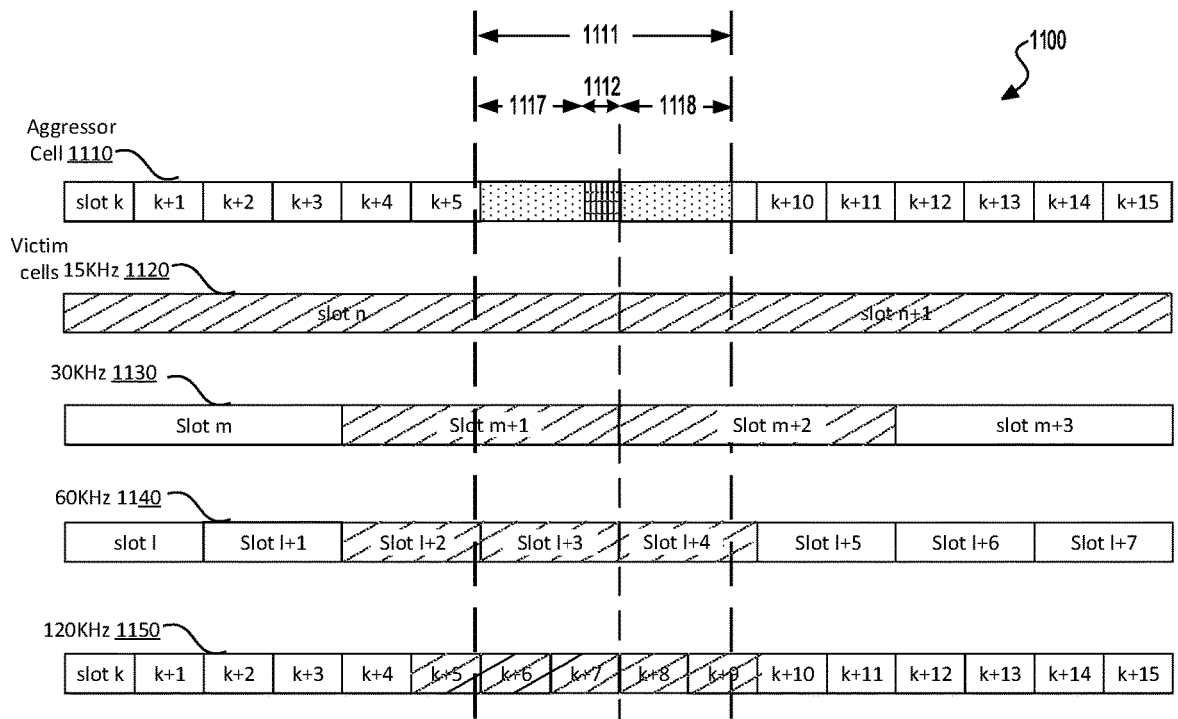

FIG. 11 shows an example 1100 of victim cells 1120, 1130, 1140, and 1150 having different numerology and an aggressor cell 1110 having an SCS of 120 kHz according to an embodiment of the disclosure. An SRS transmission process time 1111 includes 2 times the RF switching time (e.g., 1117 and 1118) plus an SRS transmission time 1112 in the aggressor cell 1110. The RF switching time can be any suitable time or duration. The RF switching time is 200 micro-seconds (us) in FIG. 11. In an embodiment, the RF switching time is one of: 0 us, 30 us, 100 us, 140 us, 200 us, 300 us, 500 us, and 900 us. For the aggressor cell 1110, an interruption length can start from a slot #k+5 and end in a slot #k+9.

Numbers of interrupted slot(s) can be different for the victim cells depending on the victim SCSs. In an embodiment, the victim cell SCS is 15 kHz for the victim cell 1120, the interrupted slots can be slots #n and #n+1. In an embodiment, the victim cell SCS is 30 kHz for the victim cell 1130, the interrupted slots can be slot #m+1 and slot #m+2. In an embodiment, the victim cell SCS is 60 kHz for the victim cell 1140, the interrupted slots can be from slot #l+2 to slot #l+4. In an embodiment, the victim cell SCS is 120 kHz for the victim cell 1150, the interrupted slots can be from slot #k+5 to slot #k+9.

Alternatively, the UE or the electronic device 110 can have the same interrupted slots in the victim cell(s) for the aggressor cell 1110 with SCS of 120 kHz in a DC scenario.

Alternatively, the victim cell(s) in a different frequency range from the aggressor cell 1110 can experience no interruption, for example, when the UE or the electronic device 110 supports the per-FR gap capability. Accordingly, the number of slots to be interrupted in the victim cell is 0.

Figure 12:
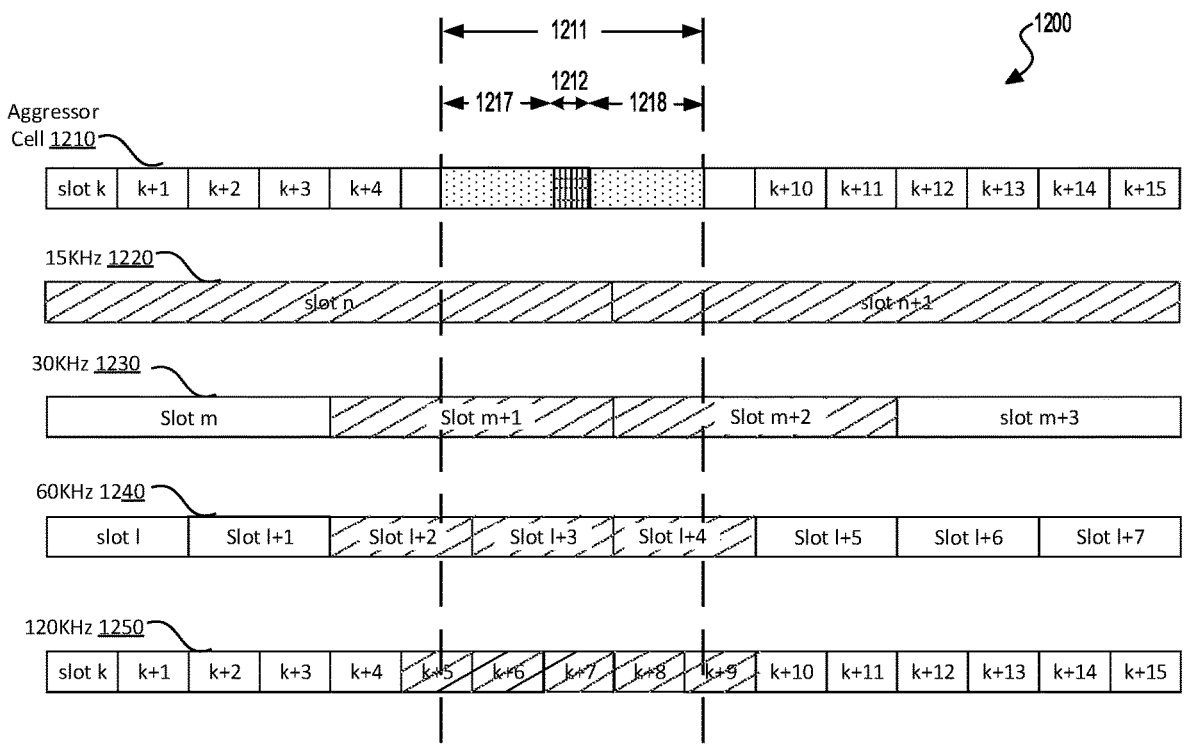

FIG. 12 shows an example 1200 of victim cells 1220, 1230, 1240, and 1250 having different numerology and an aggressor cell 1210 having an SCS of 120 kHz according to an embodiment of the disclosure. An UL TA is configured in the aggressor cell 1210. An SRS transmission process time 1211 includes 2 times the RF switching time (e.g., 1217 and 1218) plus an SRS transmission time 1212 in the aggressor cell 1210. The RF switching time can be any suitable time or duration. The RF switching time is 200 micro-seconds (us) in FIG. 12. In an embodiment, the RF switching time is one of: 0 us, 30 us, 100 us, 140 us, 200 us, 300 us, 500 us, and 900 us. For the aggressor cell 1210, an interruption length can start from a slot #k+5 and end in a slot #k+9 due to the UL TA.

Numbers of interrupted slot(s) can be different for the victim cells depending on the victim SCSs. In an embodiment, the victim cell SCS is 15 kHz for the victim cell 1220, the interrupted slots can be slots #n and #n+1. In an embodiment, the victim cell SCS is 30 kHz for the victim cell 1230, the interrupted slots can be slot #m+1 and slot #m+2. In an embodiment, the victim cell SCS is 60 kHz for the victim cell 1240, the interrupted slots can be from slot #l+2 to slot #l+4. In an embodiment, the victim cell SCS is 120 kHz for the victim cell 1250, the interrupted slots can be from slot #k+5 to slot #k+9.

Alternatively, the UE or the electronic device 110 can have the same interrupted slots in the victim cell(s) for the aggressor cell 1210 with SCS of 120 kHz in an asynchronization DC scenario.

Alternatively, the victim cell(s) in a different frequency range from the aggressor cell 1210 can experience no interruption, for example, when the UE or the electronic device 110 supports the per-FR gap capability. Accordingly, the number of slots to be interrupted in the victim cell is 0.

Figure 13:
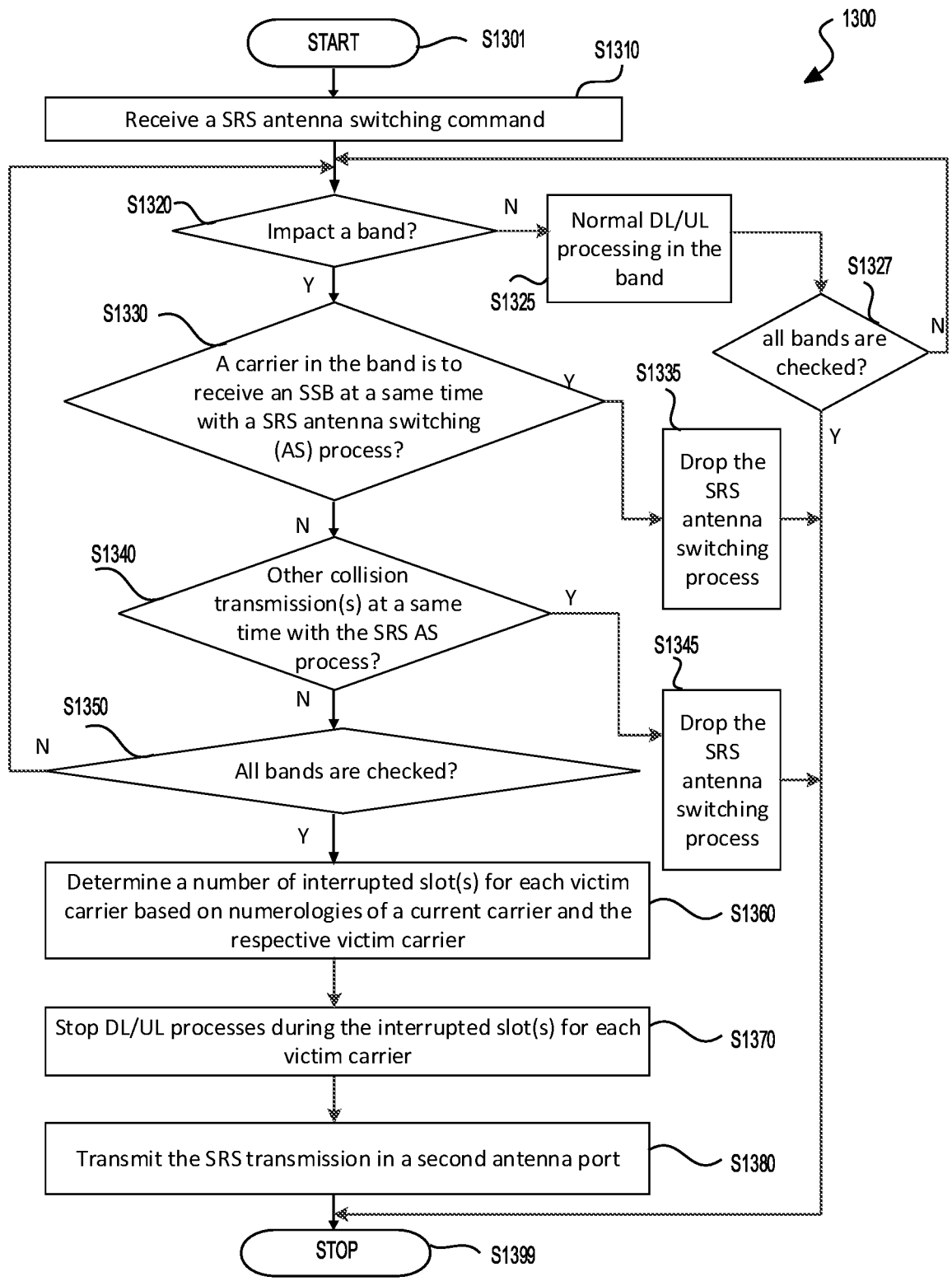
FIG. 13 shows a flowchart of an exemplary process 1300 according to an embodiment of the disclosure.

FIG. 13 shows a flowchart of an exemplary process 1300 according to an embodiment of the disclosure. The process 1300 can be used to implement the SRS transmission switching procedure described above. In an embodiment, the SRS transmission switching procedure includes a SRS antenna-based switching process (also referred to as SRS antenna switching process) for SRS antenna switching. In an example, an electronic device or an UE (e.g., the electronic device 110) is configured to perform the process 1300. Multiple carriers can be activated for the electronic device can be configured in CA and/or DC. The multiple carriers can include any suitable carriers described above, such as with reference to FIGS. 1, 2A and 2B. In an example, one or more frequency bands (e.g., the frequency bands 210, 220, and/or 230) are configured for the UE. The multiple carriers can be configured in the one or more of frequency bands (or bands). The process 1300 starts at S1301, and proceeds to S1310.

At S1310, the UE can receive higher layer signaling (e.g., via RRC), such as a SRS antenna switching command, to configure an SRS transmission with antenna switching on a current carrier (e.g., the carrier 210(2) in the band 210 in FIG. 2B). The current carrier is one of the multiple carriers activated for the UE and is in a first band (e.g., the band 210) of the one or more bands. The SRS antenna switching command can indicate an antenna switching from a first antenna port to a second antenna port.

At S1320, the UE can determine whether the SRS antenna switching process in the current carrier in the first band can impact UL/DL transmissions or processing in a band of the one or more frequency bands, for example, based on an UE capability. The band can be the first band or another band that is different from the first band. In an example, carrier(s) in the first band are impacted by the SRS antenna switching process in the current carrier in the first band, and thus S1320 is skipped for the first band. An SRS antenna switching impact table or an antenna switching band impact rule indicating whether an SRS antenna switching process on a carrier in a band (e.g., the first band) can impact carrier(s) in other band(s) can be pre-defined and stored in the UE or signaled to the UE, for example, from a network (e.g., the network 101). In an example, the SRS antenna switching impact table indicates that an SRS antenna switching process in a band has impact or has no impact on all carriers in another band. For example, when the bands 210, 220, and 230 are configured for the UE, the SRS antenna switching impact table indicates that the bands 220 and 230 are impacted by an SRS antenna switching process in a carrier in the band 210. Alternatively, the SRS antenna switching impact table indicates that the bands 220 and 230 are not impacted by an SRS antenna switching process in a carrier in the band 210. In an example, when a band is determined not to be affected by the SRS antenna switching process, all activated carriers in the band are not affected by the SRS antenna switching process.

When the SRS antenna switching process in the current carrier in the first band is determined to have no impact in the other band, the process 1300 proceeds to S1325. Otherwise, the process 1300 proceeds to S1330.

At S1325, in an example, all carriers in the band are not affected. Thus DL/UL signals in the band can be processed normally and the SRS antenna switching process in the first band has no interruption to the DL/UL signals in the other band. The process 1300 then proceeds to S1327.

At S1327, whether all of the one or more of the bands are checked can be determined. In an example, all of the one or more of the bands exclude the first band. In an example, all of the one or more of the bands include the first band. When all of the one or more of the bands are checked, the process 1300 proceeds to S1399 and terminates. Otherwise, the process 1300 returns to S1320 and continues to check a next band in the one or more of the bands.

At S1330, the UE can determine, based on the collision rule, whether an activated carrier in the band receives an SSB at a same time with the SRS antenna switching process. The SRS antenna switching process can include a first switching step (e.g., 1427 in FIG. 14) from a first antenna port to a second antenna port, an SRS transmission, a second switching step (e.g., 1428), and the like. When the activated carrier is determined to receive the SSB at the same time with the SRS antenna switching process, the process 1300 proceeds to S1335. Otherwise, the process 1300 proceeds to S1340.

At S1335, the UE can drop the SRS antenna switching process (e.g., the SRS antenna switching process 1413 in FIG. 14) on a corresponding slot (e.g., the slot n in the aggressor carrier 1410 in FIG. 14). Alternatively, in an example, the UE only drops SRS symbols that overlap with the SSB and transmits other SRS symbols that do not overlap with the SSB, similarly as described above. The process 1300 proceeds to S1399 and terminates.

At S1340, the UE can check other collisions for the SRS transmission. For example, the UE can determine whether other collision(s) (e.g., an LTE measurement) occur at a same time with the SRS antenna switching process based on the collision rule, similarly as those described in S420, S430, and S1330. When the SRS transmission is determined to have a lower priority than the other collision(s) occurring at the same time with the SRS antenna switching process, the process 1300 proceeds to S1345. Otherwise, the process 1300 proceeds to S1350.

At S1345, the UE can drop the SRS antenna switching at the corresponding slot, similarly as that described in S1335. The process 1300 proceeds to S1399 and terminates.

At S1350, the UE can determine whether all of the one or more bands are checked. When all of the one or more bands are checked, the process 1300 proceeds to S1360. Otherwise, the process 1300 returns to S1320 to check a next band.

Note that steps (e.g., S1330, S1335, S1340, and/or S1345) can be repeated for each activated carrier in the respective band being checked.

At S1360, the UE can determine a number of slots to be interrupted in each victim carrier based on the numerology of the victim carrier, the numerology of the current carrier for the SRS transmission, parameters indicating an UL TA time, CA or DC, synchronization or asynchronization DC, and/or the like. Note that the victim carriers are activated carriers and are also allocated in band(s) that are impacted by the SRS antenna switching process.

At S1370, for each victim carrier, the UE can stop UL/DL transmission(s) or processes for the number of slots to be interrupted in the respective victim carrier.

At S1380, the UE can transmit the SRS transmission on the current carrier using the second antenna port.

The process 1300 can be suitably adapted by omitting certain step(s), combining certain steps, and/or adding step(s). Any suitable order can be used to implement the process 1300. In an example, S1370 is implemented prior to S1380. Alternatively, S1380 is implemented prior to S1370.

Alternatively, when one of the victim cell(s) is not in a same frequency range with the current carrier and the UE supports the per-FR gap capability, the victim cell can experience no interruption. Accordingly, S1360 and S1370 can be omitted for the victim cell.

In an example, an SRS transmission can be used with antenna switching to acquire full DL channel information at gNB through channel reciprocity when the UE has fewer transmitting chains than receiving chains. The SRS transmission in one carrier may impact other carriers' transmission/receiving processes based on the RF design in each band combination.

As described above, FIG. 14 shows an example 1400 of the victim cells 1420, 1430, 1440, and 1450 having different numerology and the aggressor cell (or the current carrier) 1410 having an SCS of 15 kHz according to an embodiment of the disclosure. The SRS transmission process time 1411 includes 2 times the antenna switching time or duration (e.g., 1417 and 1418) plus the SRS transmission time 1412 in the aggressor cell 1410. The antenna switching time can be any suitable time or duration, such as 15 us. The antenna switching time can refer to an Rx-to-Tx transition time, a Tx-to-Rx transition time, UL antenna port switching time, or the like. The antenna switching time can be shorter than the RF switching time. For the aggressor cell 1410, an interruption length can start from a slot #n and end in a slot #n+1.

Numbers of interrupted slot(s) can be different for the victim cells depending on the victim SCSs. In an embodiment, the victim cell SCS is 15 kHz for the victim cell 1420, the interrupted slots can be slots #n and #n+1. In an embodiment, the victim cell SCS is 30 kHz for the victim cell 1430, the interrupted slots can be slot #m+1 and slot #m+2. In an embodiment, the victim cell SCS is 60 kHz for the victim cell 1440, the interrupted slots can be from slot #l+2 to slot #l+4. In an embodiment, the victim cell SCS is 120 kHz for the victim cell 1450, the interrupted slots can be from slot #k+4 to slot #k+8.

Alternatively, the UE or the electronic device 110 can have the same interrupted slots in the victim cell(s) for the aggressor cell 1410 with SCS of 15 kHz in a DC scenario.

Alternatively, the victim cell(s) in a different frequency range from the aggressor cell 1410 can experience no interruption, for example, when the UE or the electronic device 110 supports the per-FR gap capability. Accordingly, the number of slots to be interrupted in the victim cell is 0.

Figure 15:
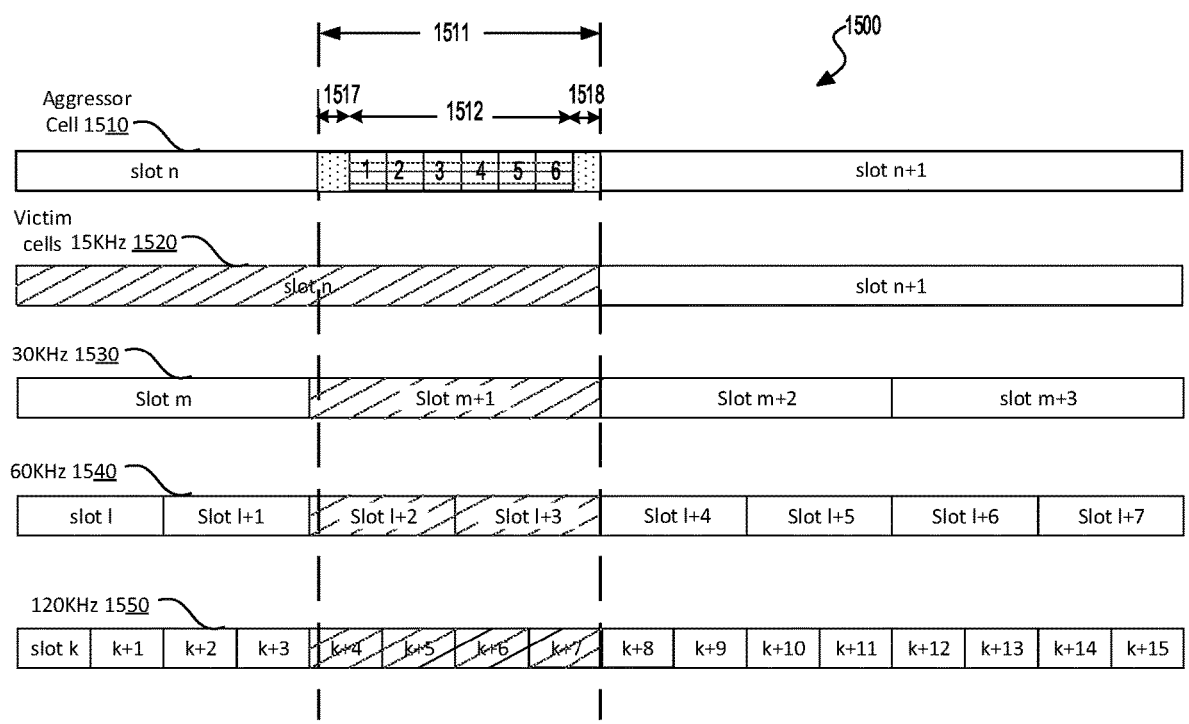

FIG. 15 shows an example 1500 of victim cells 1520, 1530, 1540, and 1550 having different numerology and an aggressor cell 1510 having an SCS of 15 kHz according to an embodiment of the disclosure. An UL TA is configured in the aggressor cell 1510. An SRS transmission process time 1511 includes 2 times the antenna switching time (e.g., 1517 and 1518) plus an SRS transmission time 1512 in the aggressor cell 1510. For the aggressor cell 1510, an interruption length can start from a slot #n and end in a slot #n due to the UL TA.

Numbers of interrupted slot(s) can be different for the victim cells depending on the victim SCSs. In an embodiment, the victim cell SCS is 15 kHz for the victim cell 1520, the interrupted slot can be the slot #n. In an embodiment, the victim cell SCS is 30 kHz for the victim cell 1530, the interrupted slot can be slot #m+1. In an embodiment, the victim cell SCS is 60 kHz for the victim cell 1540, the interrupted slots can be from slot #l+2 to slot #l+3. In an embodiment, the victim cell SCS is 120 kHz for the victim cell 1550, the interrupted slots can be from slot #k+4 to slot #k+7.

Alternatively, the UE or the electronic device 110 can have the same interrupted slots in the victim cell(s) for the aggressor cell 1510 with SCS of 15 kHz in an asynchronization DC scenario.

Alternatively, the victim cell(s) in a different frequency range from the aggressor cell 1510 can experience no interruption, for example, when the UE or the electronic device 110 supports the per-FR gap capability. Accordingly, the number of slots to be interrupted in the victim cell is 0.

Figure 16:
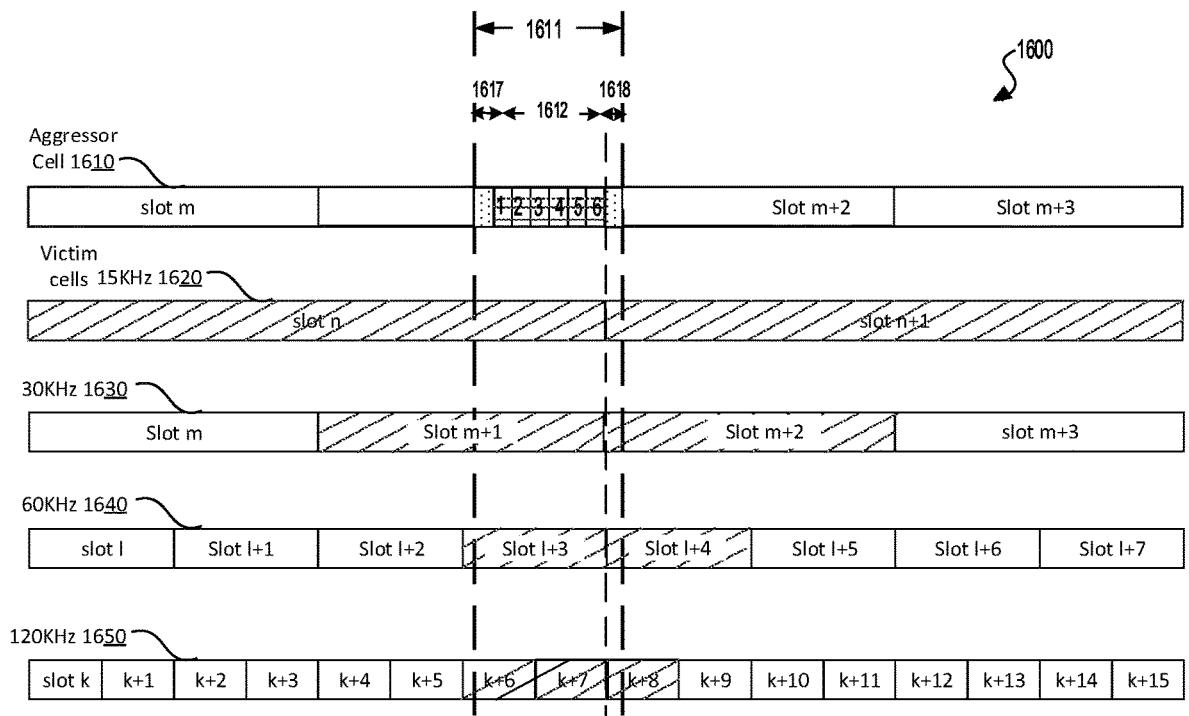

FIG. 16 shows an example 1600 of the victim cells 1620, 1630, 1640, and 1650 having different numerology and an aggressor cell (or the current carrier) 1610 having an SCS of 30 kHz according to an embodiment of the disclosure. An SRS transmission process time 1611 includes 2 times the antenna switching time (e.g., 1617 and 1618) plus an SRS transmission time 1612 in the aggressor cell 1610. For the aggressor cell 1610, an interruption length can start from a slot #m+1 and end in a slot #m+2.

Numbers of interrupted slot(s) can be different for the victim cells depending on the victim SCSs. In an embodiment, the victim cell SCS is 15 kHz for the victim cell 1620, the interrupted slots can be slots #n and #n+1. In an embodiment, the victim cell SCS is 30 kHz for the victim cell 1630, the interrupted slots can be slot #m+1 and slot #m+2. In an embodiment, the victim cell SCS is 60 kHz for the victim cell 1640, the interrupted slots can be from slot #l+3 to slot #l+4. In an embodiment, the victim cell SCS is 120 kHz for the victim cell 1650, the interrupted slots can be from slot #k+6 to slot #k+8.

Alternatively, the UE or the electronic device 110 can have the same interrupted slots in the victim cell(s) for the aggressor cell 1610 with SCS of 30 kHz in a DC scenario.

Alternatively, the victim cell(s) in a different frequency range from the aggressor cell 1610 can experience no interruption, for example, when the UE or the electronic device 110 supports the per-FR gap capability. Accordingly, the number of slots to be interrupted in the victim cell is 0.

Figure 17:
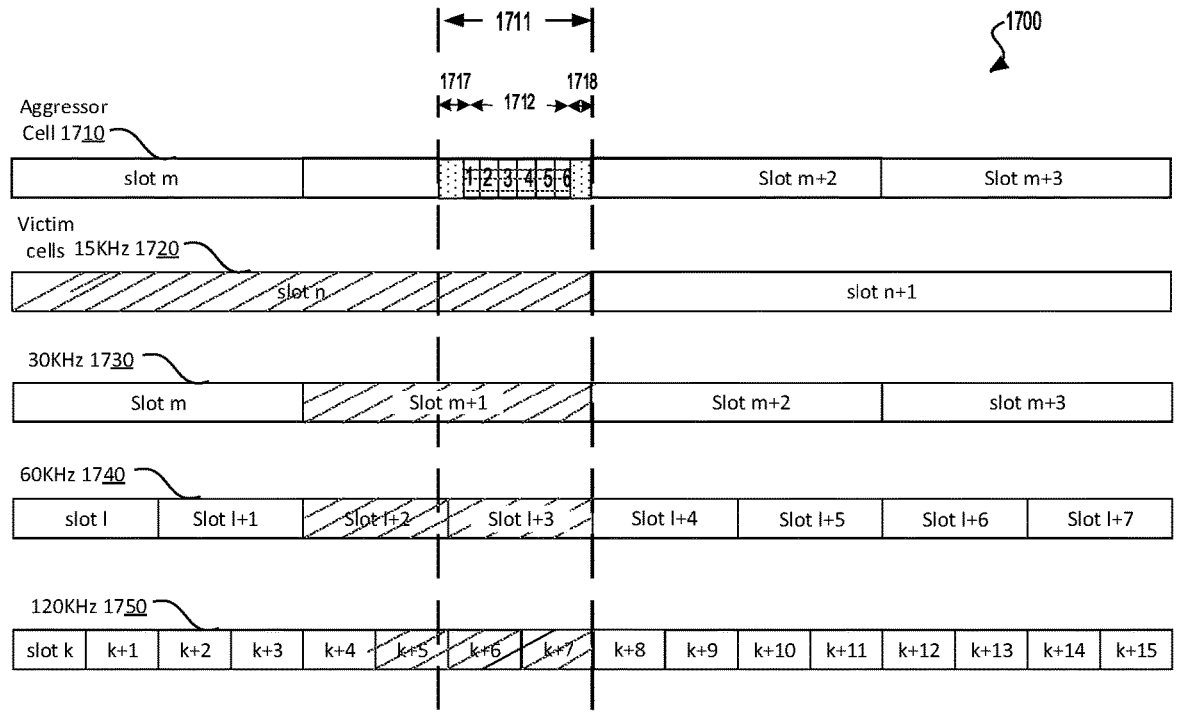

FIG. 17 shows an example 1700 of victim cells 1720, 1730, 1740, and 1750 having different numerology and an aggressor cell 1710 having an SCS of 30 kHz according to an embodiment of the disclosure. An UL TA is configured in the aggressor cell 1710. An SRS transmission process time 1711 includes 2 times the antenna switching time (e.g., 1717 and 1718) plus an SRS transmission time 1712 in the aggressor cell 1710. For the aggressor cell 1710, an interruption length can start from a slot #m+1 and end in a slot #m+1 due to the UL TA.

Numbers of interrupted slot(s) can be different for the victim cells depending on the victim SCSs. In an embodiment, the victim cell SCS is 15 kHz for the victim cell 1720, the interrupted slot can be a slot #n. In an embodiment, the victim cell SCS is 30 kHz for the victim cell 1730, the interrupted slot can be a slot #m+1. In an embodiment, the victim cell SCS is 60 kHz for the victim cell 1740, the interrupted slots can be from slot #l+2 to slot #l+3. In an embodiment, the victim cell SCS is 120 kHz for the victim cell 1750, the interrupted slots can be from slot #k+5 to slot #k+7.

Alternatively, the UE or the electronic device 110 can have the same interrupted slots in the victim cell(s) for the aggressor cell 1710 with SCS of 30 kHz in an asynchronization DC scenario.

Alternatively, the victim cell(s) in a different frequency range from the aggressor cell 1710 can experience no interruption, for example, when the UE or the electronic device 110 supports the per-FR gap capability. Accordingly, the number of slots to be interrupted in the victim cell is 0.

Figure 18:
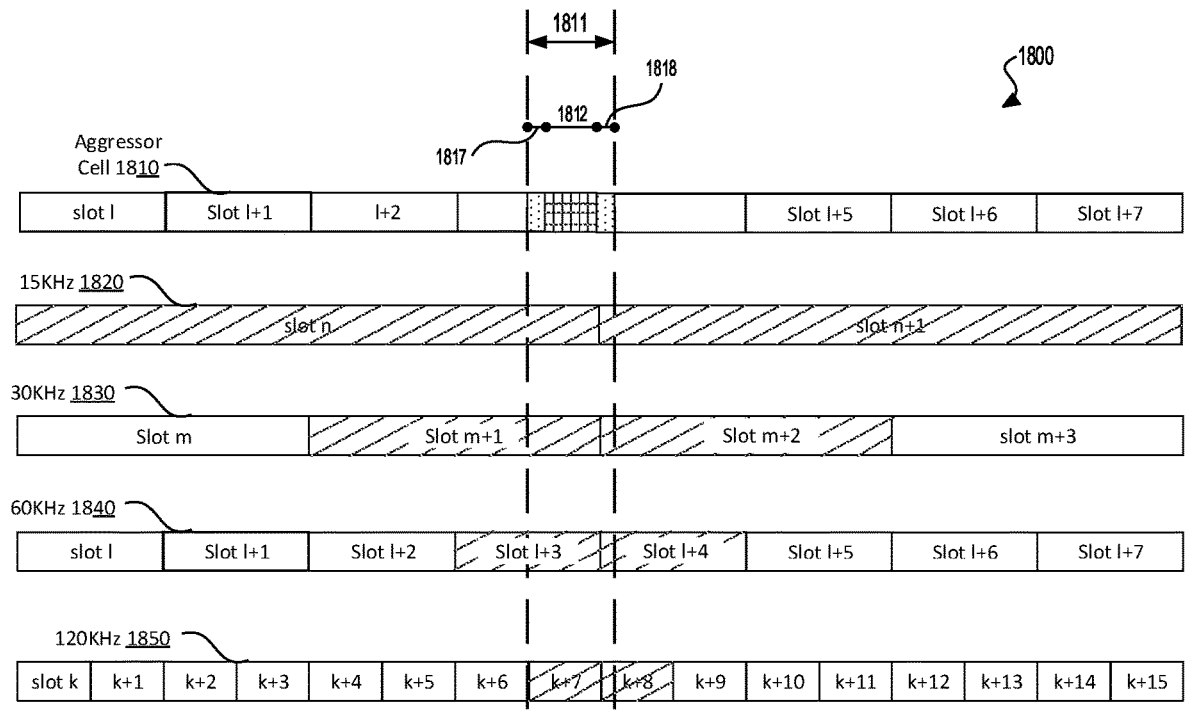

FIG. 18 shows an example 1800 of the victim cells 1820, 1830, 1840, and 1850 having different numerology and an aggressor cell (or the current carrier) 1810 having an SCS of 30 kHz according to an embodiment of the disclosure. An SRS transmission process time 1811 includes 2 times the antenna switching time (e.g., 1817 and 1818) plus an SRS transmission time 1812 in the aggressor cell 1810. For the aggressor cell 1810, an interruption length can start from a slot #l+3 and end in a slot #l+4.

Numbers of interrupted slot(s) can be different for the victim cells depending on the victim SCSs. In an embodiment, the victim cell SCS is 15 kHz for the victim cell 1820, the interrupted slots can be slots #n and #n+1. In an embodiment, the victim cell SCS is 30 kHz for the victim cell 1830, the interrupted slots can be slot #m+1 and slot #m+2. In an embodiment, the victim cell SCS is 60 kHz for the victim cell 1840, the interrupted slots can be from slot #l+3 to slot #l+4. In an embodiment, the victim cell SCS is 120 kHz for the victim cell 1850, the interrupted slots can be from slot #k+7 to slot #k+8.

Alternatively, the UE or the electronic device 110 can have the same interrupted slots in the victim cell(s) for the aggressor cell 1810 with SCS of 60 kHz in a DC scenario.

Alternatively, the victim cell(s) in a different frequency range from the aggressor cell 1810 can experience no interruption, for example, when the UE or the electronic device 110 supports the per-FR gap capability. Accordingly, the number of slots to be interrupted in the victim cell is 0.

Figure 19:
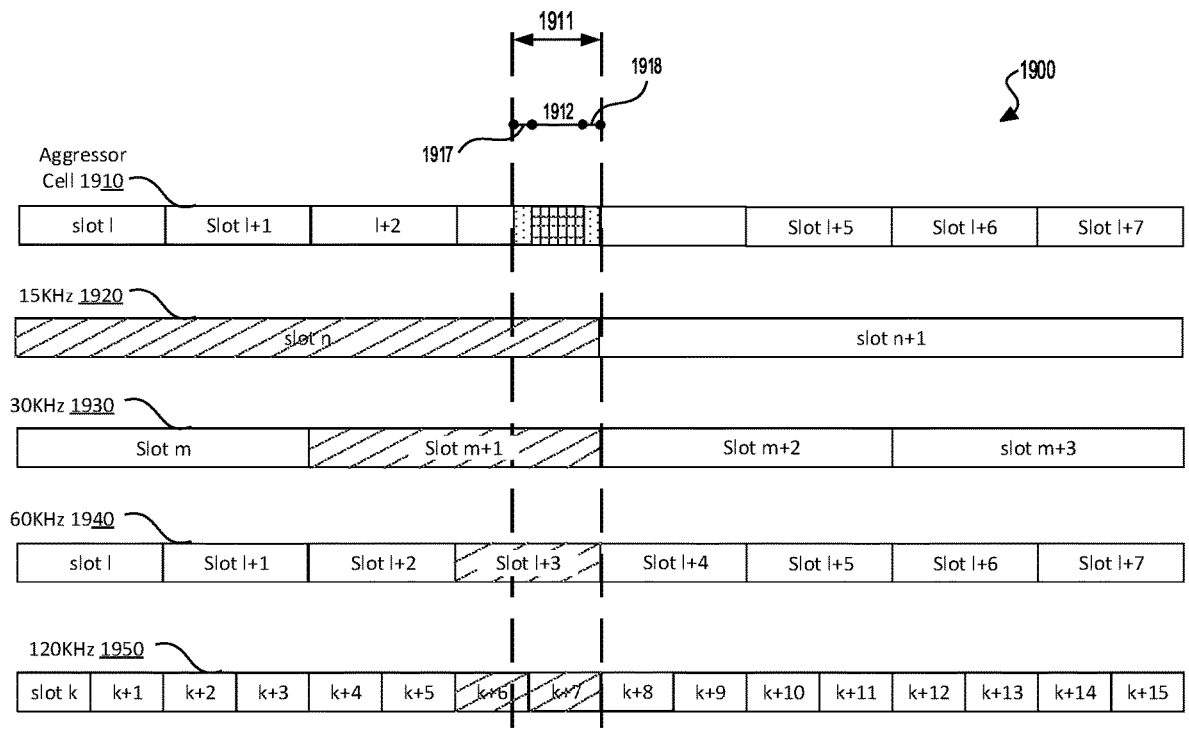

FIG. 19 shows an example 1900 of victim cells 1920, 1930, 1940, and 1950 having different numerology and an aggressor cell 1910 having an SCS of 60 kHz according to an embodiment of the disclosure. An UL TA is configured in the aggressor cell 1910. An SRS transmission process time 1911 includes 2 times the antenna switching time (e.g., 1917 and 1918) plus an SRS transmission time 1912 in the aggressor cell 1910. For the aggressor cell 1910, an interruption length can start from a slot #l+3 and end in a slot #l+3 due to the UL TA.

Numbers of interrupted slot(s) can be different for the victim cells depending on the victim SCSs. In an embodiment, the victim cell SCS is 15 kHz for the victim cell 1920, the interrupted slot can be slot #n. In an embodiment, the victim cell SCS is 30 kHz for the victim cell 1930, the interrupted slot can be slot #m+1. In an embodiment, the victim cell SCS is 60 kHz for the victim cell 1940, the interrupted slot can be slot #l+3. In an embodiment, the victim cell SCS is 120 kHz for the victim cell 1950, the interrupted slots can be from slot #k+6 to slot #k+7.

Alternatively, the UE or the electronic device 110 can have the same interrupted slots in the victim cell(s) for the aggressor cell 1910 with SCS of 60 kHz in an asynchronization DC scenario.

Alternatively, the victim cell(s) in a different frequency range from the aggressor cell 1910 can experience no interruption, for example, when the UE or the electronic device 110 supports the per-FR gap capability. Accordingly, the number of slots to be interrupted in the victim cell is 0.

Figure 20:
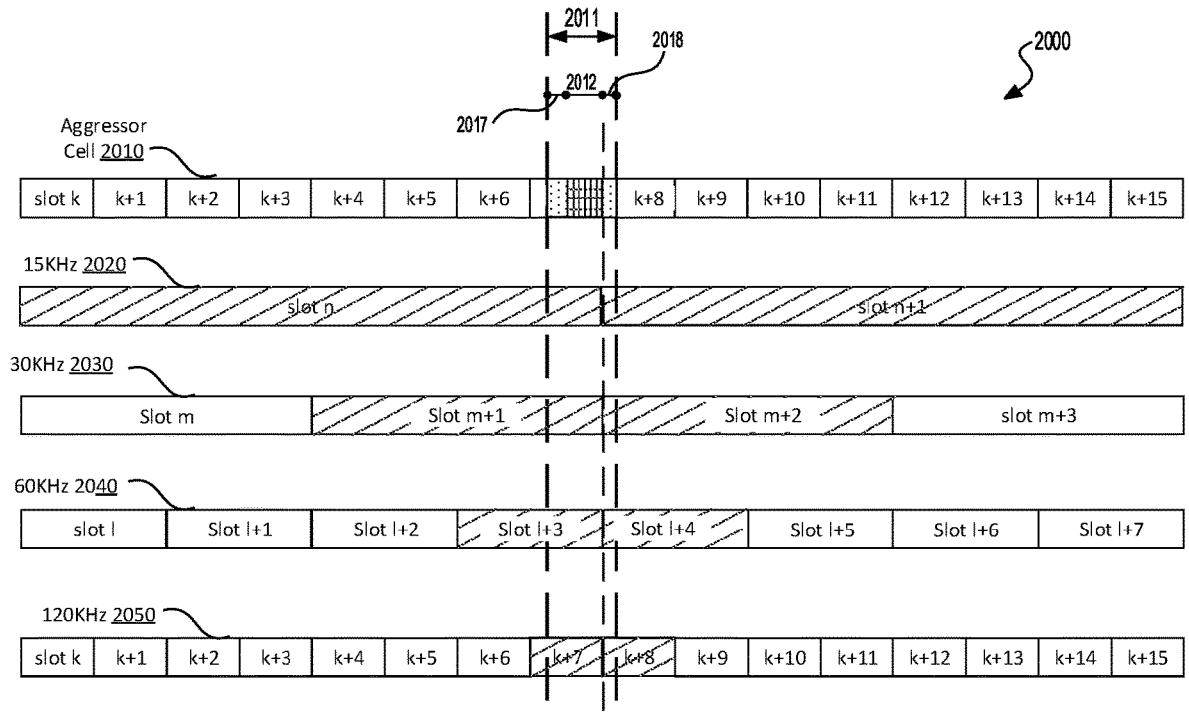

FIG. 20 shows an example 2000 of the victim cells 2020, 2030, 2040, and 2050 having different numerology and an aggressor cell (or the current carrier) 2010 having an SCS of 120 kHz according to an embodiment of the disclosure. An SRS transmission process time 2011 includes 2 times the antenna switching time (e.g., 2017 and 2018) plus an SRS transmission time 2012 in the aggressor cell 2010. For the aggressor cell 2010, an interruption length can start from a slot #k+7 and end in a slot #k+8.

Numbers of interrupted slot(s) can be different for the victim cells depending on the victim SCSs. In an embodiment, the victim cell SCS is 15 kHz for the victim cell 2020, the interrupted slots can be slots #n and #n+1. In an embodiment, the victim cell SCS is 30 kHz for the victim cell 2030, the interrupted slots can be slot #m+1 and slot #m+2. In an embodiment, the victim cell SCS is 60 kHz for the victim cell 2040, the interrupted slots can be from slot l+3 to slot #l+4. In an embodiment, the victim cell SCS is 120 kHz for the victim cell 2050, the interrupted slots can be from slot #k+7 to slot #k+8.

Alternatively, the UE or the electronic device 110 can have the same interrupted slots in the victim cell(s) for the aggressor cell 2010 with SCS of 120 kHz in a DC scenario.

Alternatively, the victim cell(s) in a different frequency range from the aggressor cell 2010 can experience no interruption, for example, when the UE or the electronic device 110 supports the per-FR gap capability. Accordingly, the number of slots to be interrupted in the victim cell is 0.

Figure 21:
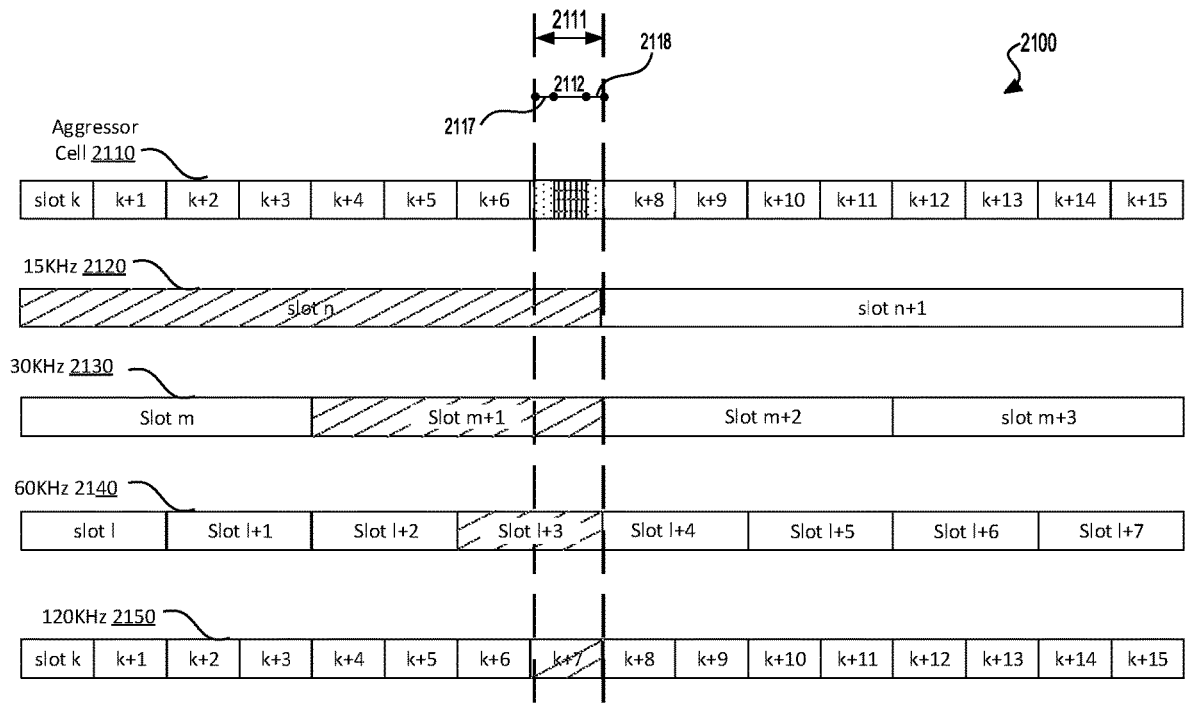

FIG. 21 shows an example 2100 of victim cells 2120, 2130, 2140, and 2150 having different numerology and an aggressor cell 2110 having an SCS of 120 kHz according to an embodiment of the disclosure. An UL TA is configured in the aggressor cell 2110. An SRS transmission process time 2111 includes 2 times the antenna switching time (e.g., 2117 and 2118) plus an SRS transmission time 2112 in the aggressor cell 2110. For the aggressor cell 2110, an interruption length can start from a slot #k+7 and end in a slot #k+7 due to the UL TA.

Numbers of interrupted slot(s) can be different for the victim cells depending on the victim SCSs. In an embodiment, the victim cell SCS is 15 kHz for the victim cell 2120, the interrupted slot can be slot #n. In an embodiment, the victim cell SCS is 30 kHz for the victim cell 2130, the interrupted slot can be slot #m+1. In an embodiment, the victim cell SCS is 60 kHz for the victim cell 2140, the interrupted slot can be slot #l+3. In an embodiment, the victim cell SCS is 120 kHz for the victim cell 2150, the interrupted slot can be slot #k+7.

Alternatively, the UE or the electronic device 110 can have the same interrupted slots in the victim cell(s) for the aggressor cell 2110 with SCS of 120 kHz in an asynchronization DC scenario.

Alternatively, the victim cell(s) in a different frequency range from the aggressor cell 2110 can experience no interruption, for example, when the UE or the electronic device 110 supports the per-FR gap capability. Accordingly, the number of slots to be interrupted in the victim cell is 0.

Figure 22:
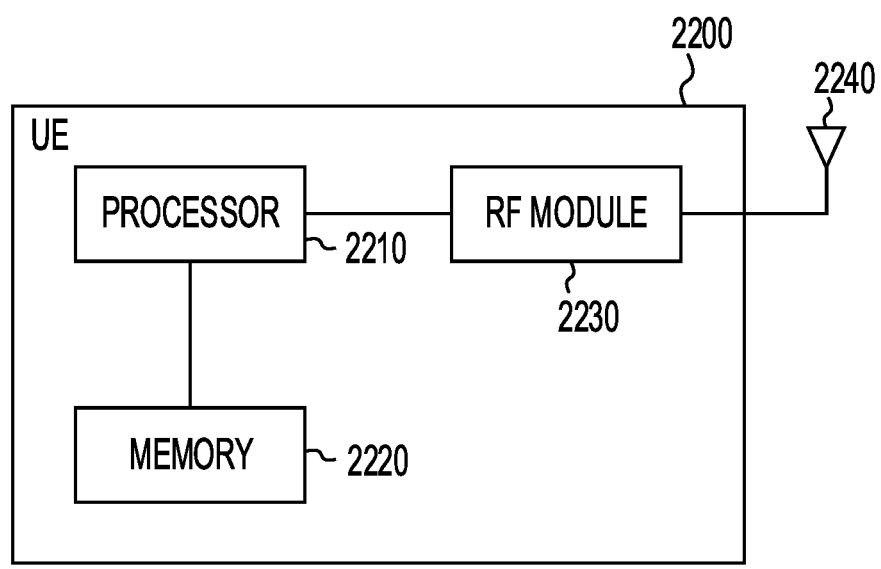
FIG. 22 shows an exemplary block diagram of an electronic device 2200 according to an embodiment of the disclosure.

FIG. 22 shows an exemplary block diagram of an electronic device 2200 (e.g., a UE 2200) according to an embodiment of the disclosure. The UE 2200 can be configured to implement various embodiments of the disclosure described herein. The UE 2200 can include a processor (or processing circuitry) 2210, memory 2220, and a radio frequency (RF) module 2230 that are coupled together as shown in FIG. 22. The processor 2210, the memory 2220, and the RF module 2230 can also be coupled differently from the example shown in FIG. 22. In various examples, the UE 2200 can be a mobile phone, a tablet computer, a desktop computer, a vehicle carried device, and the like.

The processor 2210 can be configured to perform various functions of the electronic device 110 described above with reference to FIGS. 1, 2A, 2B, 3, 4, 5A-5D, and 6-21. The processor 2210 can include signal processing circuitry to process received or to be transmitted data according to communication protocols specified in, for example, LTE and NR standards. The processor 2210 can execute program instructions, for example, stored in the memory 2220, to perform functions related with different communication protocols. The processor 2210 can be implemented with suitable hardware, software, or a combination thereof. For example, the processor 2210 can be implemented with application specific integrated circuits (ASIC), field programmable gate arrays (FPGA), and the like, that includes circuitry. The circuitry can be configured to perform various functions of the processor 2210.

In one example, the memory 2220 can store program instructions that, when executed by the processor 2210, cause the processor 2210 to perform various functions as described in the disclosure. The memory 2220 can include a ROM, a RAM, a flash memory, a solid state memory, a hard disk drive, and the like.

The RF module 2230 can be configured to receive a digital signal from the processor 2210 and accordingly transmit a signal to a base station in a wireless communication network via an antenna 2240. In addition, the RF module 2230 can be configured to receive a wireless signal from a base station and accordingly generate a digital signal which is provided to the processor 2210. The RF module 2230 can include digital to analog/analog to digital converters (DAC/ADC), frequency down/up converters, filters, and amplifiers for reception and transmission operations. For example, the RF module 2230 can include converter circuits, filter circuits, amplification circuits, and the like, for processing signals on different carriers or bandwidth parts. In an example, the UE does not support the per-FR gap capability. In an example, the RF module 2230 includes multiple sets of transceivers and antenna ports for FR1 and FR2, respectively, and the UE can support the per-FR gap capability.

The UE 2200 can optionally include other components, such as input and output devices, additional CPU or signal processing circuitry, and the like. Accordingly, the UE 2200 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a RAM, a ROM, a magnetic disk and an optical disk, and the like. The computer-readable non-transitory storage medium can include all types of computer readable medium, including magnetic storage medium, optical storage medium, flash medium and solid state storage medium.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays, (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for a sounding reference signal (SRS) transmission switching process, comprising:
   determining whether a colliding data transceiving is scheduled in one of a set of carriers at a same time as an SRS transmission switching process for an SRS transmission being scheduled in a current carrier in the set of carriers, wherein the set of carriers are activated for an electronic device, and wherein the colliding data transceiving has a higher priority than the SRS transmission; and
   when no colliding data transceiving is determined to be scheduled in the set of carriers at the same time with the SRS transmission switching process,
   determining a one or more SRS interruption slots during the SRS transmission switching process for a victim carrier that is to be interrupted by the SRS transmission switching process, wherein the SRS transmission switching process occupies the one or more colliding slots with a current numerology on the current carrier, and wherein the one or more SRS interruption slots are determined based on the numerology of the current carrier, and a numerology of the victim carrier, and wherein the victim carrier is in the set of carriers and different from the current carrier; and
   transmitting the scheduled SRS transmission in the current carrier when no colliding data transceiving is determined.

2. The method according to claim 1, further comprising:
   when colliding data transceiving is determined to be scheduled in the one of the set of carriers at the same time with the SRS transmission switching process, discarding a portion of the SRS transmission from being transmitted in the current carrier, wherein the portion of the discarded SRS transmission scheduled on one or more slots that collides with the colliding data transceiving is scheduled on one or more slots that collides with the colliding data transceiving.

3. The method according to claim 1, wherein colliding data transceiving includes a synchronization signal block (SSB) from a network to the electronic device.

4. The method according to claim 1, further comprising when no colliding data transceiving is determined to be scheduled in the set of carriers at the same time with the SRS transmission switching process, wherein
   an SRS transmission switching duration is based on a duration of the SRS transmission and a duration for one or more SRS switching process;
   the SRS transmission duration is based on the numerology of the current carrier that includes a SCS of the current carrier;
   the one or more SRS interruption slots for the victim carrier is are a number of slots in the victim carrier to be interrupted by the SRS transmission switching process; and
   transmitting no downlink (DL) and/or uplink (UL) data in the number of slots in the victim carrier.

5. The method according to claim 4, wherein the method further includes:
   prior to transmitting the scheduled SRS transmission, switching from a first antenna port to a second antenna port in the current carrier in a first antenna switching duration; and
   after transmitting the scheduled SRS transmission, switching from the second antenna port to the first antenna port in a second antenna switching duration;
   transmitting the scheduled SRS transmission includes transmitting the scheduled SRS transmission in the current carrier using the second antenna port;
   the SRS switching duration includes the first antenna switching duration and the second antenna switching duration; and
   the SRS transmission switching duration on the current carrier is a sum of the SRS transmission duration and the SRS switching duration.

6. The method according to claim 4, wherein the method further includes:
   prior to transmitting the scheduled SRS transmission, switching from a previous carrier to the current carrier in a first carrier switching duration; and
   after transmitting the scheduled SRS transmission, switching from the current carrier to the previous carrier in a second carrier switching duration;
   the SRS switching duration includes the first carrier switching duration and the second carrier switching duration; and
   the SRS transmission switching duration on the current carrier is a sum of the SRS transmission duration and the SRS switching duration.

7. The method according to claim 4, wherein the SRS transmission switching process includes:
   a first SRS sub-switching process having a first switching step from a first carrier to the current carrier and the SRS transmission on the current carrier; and
   a second SRS sub-switching process having a second switching step from the current carrier to a third carrier, another SRS transmission on the third carrier, and a third switching step from the third carrier to the first carrier;
   the SRS switching duration is a sum of a first switching duration of the first switching step, a second switching duration of the second switching step, and a third switching duration of the third switching step;
   the SRS transmission switching duration is a sum of the SRS transmission duration, another SRS transmission duration of the other SRS transmission, and the SRS switching duration; and
   the number of slots in the victim carrier to be interrupted by the SRS transmission switching process is further determined based on an interruption gap between the first SRS sub-switching process and the second SRS sub-switching process.

8. The method according to claim 4, wherein the victim carrier is not in a same frequency range (FR) as the current carrier and the electronic device is configured with per-FR gap capability, determination of the number of slots is skipped.

9. The method according to claim 1, wherein the victim carrier is in a same frequency range (FR) as the current carrier.

10. The method according to claim 5, wherein
one or more frequency bands are configured for the electronic device; and
determining whether the colliding data transceiving is scheduled in the one of the set of carriers at the same time with the SRS transmission switching process further includes:
determining whether the one or more frequency bands are affected by the SRS transmission switching process; and
when at least one of the one or more frequency bands is determined to be affected by the SRS transmission switching process, determining whether the colliding data transceiving is scheduled in the one of the set of carriers at the same time with the SRS transmission switching process, the one of the set of carriers being in the at least one of the one or more frequency bands.

11. An electronic device for a sounding reference signal (SRS) transmission switching process, comprising processing circuitry configured to:
determine whether a colliding data transceiving is scheduled in one of a set of carriers at a same time as an SRS transmission switching process for an SRS transmission being scheduled in a current carrier in the set of carriers, wherein the set of carriers are activated for an electronic device, and wherein the colliding data transceiving has a higher priority than the SRS transmission; and
when no colliding data transceiving is determined to be scheduled in the set of carriers at the same time with the SRS transmission switching process,
determine a one or more SRS interruption slots during the SRS transmission switching process for a victim carrier that is to be interrupted by the SRS transmission switching process, wherein the SRS transmission switching process occupies the one or more colliding slots with a current numerology on the current carrier, and wherein the one or more SRS interruption slots are determined based on the numerology of the current carrier, and a numerology of the victim carrier, and wherein the victim carrier is in the set of carriers and different from the current carrier; and
transmit the scheduled SRS transmission in the current carrier.

12. The electronic device according to claim 11, wherein the processing circuitry is further configured to:
when the colliding data transceiving is determined to be scheduled in the one of the set of carriers at the same time with the SRS transmission switching process, discard a portion of the SRS transmission from being transmitted in the current carrier, the portion of the SRS transmission being scheduled at the same time with the collision.

13. The electronic device according to claim 11, wherein the colliding data transceiving in the one of the set of carriers includes a synchronization signal block (SSB) from a network to the electronic device.

14. The electronic device according to claim 11, when no colliding data transceiving is determined to be scheduled in the set of carriers at the same time with the SRS transmission switching process, wherein
an SRS transmission switching duration is based on a duration of the SRS transmission and a duration for one or more SRS switching process;

the SRS transmission duration is based on the numerology of the current carrier that includes a SCS of the current carrier;
the one or more SRS interruption slots for the victim carrier is are a number of slots in the victim carrier to be interrupted by the SRS transmission switching process; and
the processing circuitry is further configured to transmit no downlink (DL) and/or uplink (UL) data in the number of slots in the victim carrier.

15. The electronic device according to claim 14, wherein the processing circuitry is further configured to:
prior to transmitting the scheduled SRS transmission, switch from a first antenna port to a second antenna port in the current carrier in a first antenna switching duration; and
after transmitting the scheduled SRS transmission, switch from the second antenna port to the first antenna port in a second antenna switching duration;
transmit the scheduled SRS transmission in the current carrier using the second antenna port;
the SRS switching duration includes the first antenna switching duration and the second antenna switching duration; and
the SRS transmission switching duration on the current carrier is a sum of the SRS transmission duration and the SRS switching duration.

16. The electronic device according to claim 14, wherein the processing circuitry is further configured to:
prior to transmitting the scheduled SRS transmission, switch from a previous carrier to the current carrier in a first carrier switching duration; and
after transmitting the scheduled SRS transmission, switch from the current carrier to the previous carrier in a second carrier switching duration;
the SRS switching duration includes the first carrier switching duration and the second carrier switching duration; and
the SRS transmission switching duration on the current carrier is a sum of the SRS transmission duration and the SRS switching duration.

17. The electronic device according to claim 14, wherein the SRS transmission switching process includes:
a first SRS sub-switching process having a first switching step from a first carrier to the current carrier and the SRS transmission on the current carrier; and
a second SRS sub-switching process having a second switching step from the current carrier to a third carrier, another SRS transmission on the third carrier, and a third switching step from the third carrier to the first carrier;
the SRS switching duration is a sum of a first switching duration of the first switching step, a second switching duration of the second switching step, and a third switching duration of the third switching step;
the SRS transmission switching duration is a sum of the SRS transmission duration, another SRS transmission duration of the other SRS transmission, and the SRS switching duration; and
the number of slots in the victim carrier to be interrupted by the SRS transmission switching process is further determined based on an interruption gap between the first SRS sub-switching process and the second SRS sub-switching process.

18. The electronic device according to claim 14, wherein the victim carrier is not in a same frequency range (FR) as the current carrier and the electronic device is configured with per-FR gap capability, determination of the number of slots is skipped.

19. The electronic device according to claim 11, wherein the victim carrier is in a same frequency range (FR) as the current carrier.

20. The electronic device according to claim 15, wherein
one or more frequency bands are configured for the electronic device; and
the processing circuitry is further configured to:
determine whether the one or more frequency bands are affected by the SRS transmission switching process; and
when at least one of the one or more frequency bands is determined to be affected by the SRS transmission switching process, determine whether the colliding data transceiving is scheduled in the one of the set of carriers at the same time with the SRS transmission switching process, the one of the set of carriers being in the at least one of the one or more frequency bands.

* * * * *